United States Patent
Khan

(10) Patent No.: US 8,774,310 B2
(45) Date of Patent: Jul. 8, 2014

(54) LOW OVERHEAD MIMO SCHEME

(75) Inventor: Farooq Khan, Allen, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 1003 days.

(21) Appl. No.: 12/583,824

(22) Filed: Aug. 26, 2009

(65) Prior Publication Data

US 2010/0091905 A1 Apr. 15, 2010

Related U.S. Application Data

(60) Provisional application No. 61/196,015, filed on Oct. 14, 2008.

(51) Int. Cl.
*H04K 1/02* (2006.01)
*H04L 25/03* (2006.01)
*H04L 25/49* (2006.01)

(52) U.S. Cl.
USPC ........... 375/296; 375/133; 375/260; 375/285; 375/346

(58) Field of Classification Search
CPC ... H04L 5/0053; H04L 1/1671; H04L 1/0028; H04L 1/0073; H04L 2025/03426; H04W 28/06; H04W 72/042; H04W 72/1289
USPC ............... 375/130–133, 140, 141, 259–260, 375/295–296, 316, 340–342, 346, 349
See application file for complete search history.

(56) References Cited

U.S. PATENT DOCUMENTS

| | | | |
|---|---|---|---|
| 8,477,868 B2 * | 7/2013 | Han et al. | 375/267 |
| 2007/0099578 A1 * | 5/2007 | Adeney et al. | 455/69 |
| 2007/0160162 A1 * | 7/2007 | Kim et al. | 375/267 |
| 2008/0318606 A1 * | 12/2008 | Tsutsui et al. | 455/500 |
| 2009/0154588 A1 * | 6/2009 | Chen et al. | 375/267 |
| 2010/0075705 A1 * | 3/2010 | van Rensburg et al. | 455/509 |
| 2010/0118828 A1 * | 5/2010 | Kwon et al. | 370/330 |

* cited by examiner

*Primary Examiner* — Sam K Ahn
*Assistant Examiner* — James M Perez

(57) ABSTRACT

Systems and methods are disclosed for use in a communications network that includes transmitting a set of known precodes on a plurality of subbands and storing a correlation of transmitted precodes with a time of transmission of the precodes. These systems and methods also include receiving a set of channel quality indicators (CQI) that correspond to the time of transmission of the precodes and determining which precodes may be used in communication based upon the received CQIs and the correlation of the transmitted precodes with the time of transmission of the precodes.

20 Claims, 27 Drawing Sheets

| CODEBOOK INDEX | $\mu_n$ | NUMBER OF LAYERS $\mu$ | | | |
|---|---|---|---|---|---|
| | | 1 | 2 | 3 | 4 |
| 0 | $\mu_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $\mu_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $\mu_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $\mu_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $\mu_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $\mu_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $\mu_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $\mu_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $\mu_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $\mu_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $\mu_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $\mu_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $\mu_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $\mu_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $\mu_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $\mu_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

FIG. 12

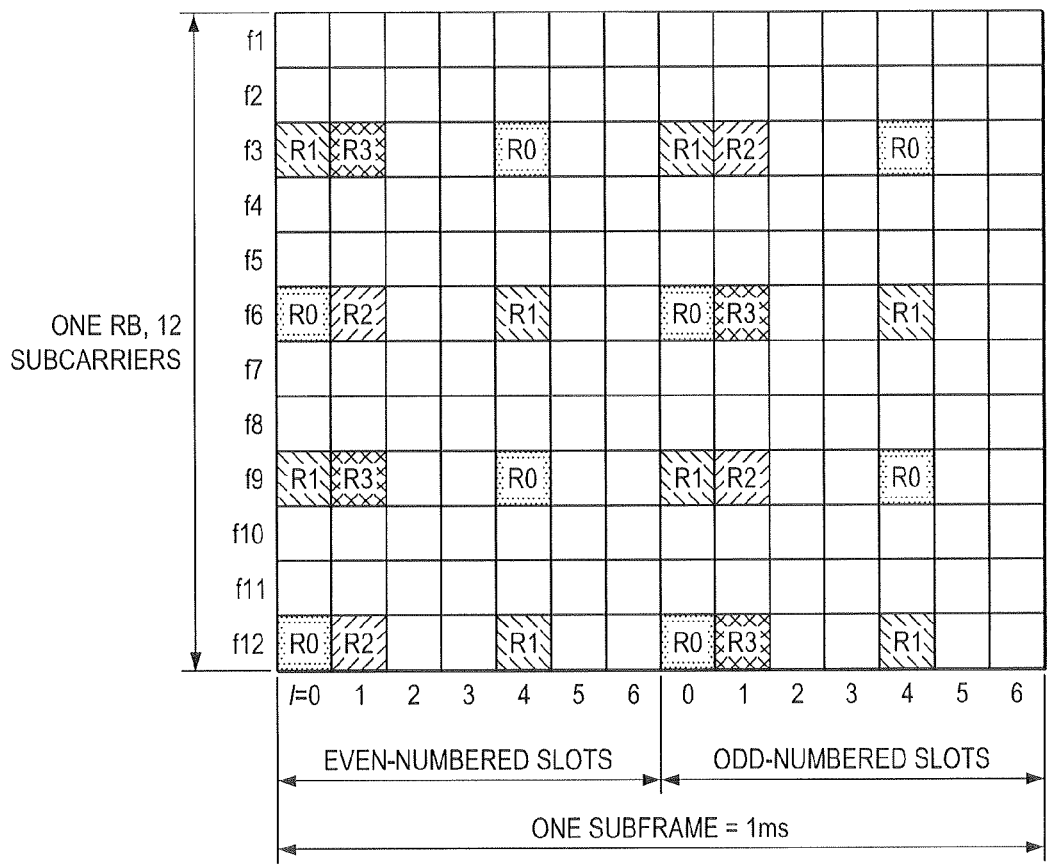

FIG. 15

| | SF#1 | SF#2 | SF#3 | SF#4 | SF#5 | SF#6 |
|---|---|---|---|---|---|---|
| SB#1 | $w_0^{\{1\}}$ | $w_5^{\{1\}}$ | $w_{10}^{\{1\}}$ | $w_{15}^{\{1\}}$ | $w_4^{\{1\}}$ | $w_9^{\{1\}}$ |
| SB#2 | $w_1^{\{1\}}$ | $w_6^{\{1\}}$ | $w_{11}^{\{1\}}$ | $w_0^{\{1\}}$ | $w_5^{\{1\}}$ | $w_{10}^{\{1\}}$ |
| SB#3 | $w_2^{\{1\}}$ | $w_7^{\{1\}}$ | $w_{12}^{\{1\}}$ | $w_1^{\{1\}}$ | $w_6^{\{1\}}$ | $w_{11}^{\{1\}}$ |
| SB#4 | $w_3^{\{1\}}$ | $w_8^{\{1\}}$ | $w_{13}^{\{1\}}$ | $w_2^{\{1\}}$ | $w_7^{\{1\}}$ | $w_{12}^{\{1\}}$ |
| SB#5 | $w_4^{\{1\}}$ | $w_9^{\{1\}}$ | $w_{14}^{\{1\}}$ | $w_3^{\{1\}}$ | $w_8^{\{1\}}$ | $w_{13}^{\{1\}}$ |

FIG. 16

| | SF#(k+1) | SF#(k+2) | SF#(k+3) | SF#(k+4) | SF#(k+5) | SF#(k+6) |
|---|---|---|---|---|---|---|
| SB#1 | $w_4^{\{1\}}$ | $w_5^{\{1\}}$ | $w_{14}^{\{1\}}$ | $w_{12}^{\{1\}}$ | $w_0^{\{1\}}$ | $w_4^{\{1\}}$ |
| SB#2 | $w_1^{\{1\}}$ | $w_3^{\{1\}}$ | $w_{13}^{\{1\}}$ | $w_8^{\{1\}}$ | $w_1^{\{1\}}$ | $w_1^{\{1\}}$ |
| SB#3 | $w_6^{\{1\}}$ | $w_1^{\{1\}}$ | $w_1^{\{1\}}$ | $w_{10}^{\{1\}}$ | $w_7^{\{1\}}$ | $w_6^{\{1\}}$ |
| SB#4 | $w_9^{\{1\}}$ | $w_{11}^{\{1\}}$ | $w_4^{\{1\}}$ | $w_{15}^{\{1\}}$ | $w_9^{\{1\}}$ | $w_9^{\{1\}}$ |
| SB#5 | $w_{15}^{\{1\}}$ | $w_{15}^{\{1\}}$ | $w_{12}^{\{1\}}$ | $w_3^{\{1\}}$ | $w_{15}^{\{1\}}$ | $w_2^{\{1\}}$ |

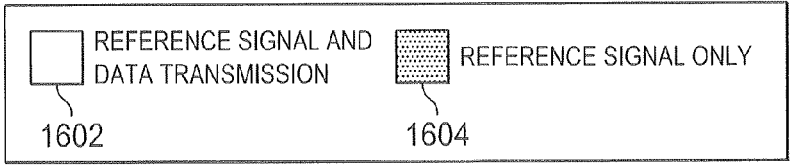

☐ REFERENCE SIGNAL AND DATA TRANSMISSION — 1602
▓ REFERENCE SIGNAL ONLY — 1604

| | SF#1 | SF#2 | SF#3 | SF#4 |
|---|---|---|---|---|
| SB#1 | $W_0^{\{1\}}$ | $W_4^{\{1\}}$ | $W_8^{\{1\}}$ | $W_{12}^{\{1\}}$ |
| SB#2 | $W_0^{\{1\}}$ | $W_4^{\{1\}}$ | $W_8^{\{1\}}$ | $W_{12}^{\{1\}}$ |
| SB#3 | $W_0^{\{1\}}$ | $W_4^{\{1\}}$ | $W_8^{\{1\}}$ | $W_{12}^{\{1\}}$ |
| SB#4 | $W_0^{\{1\}}$ | $W_4^{\{1\}}$ | $W_8^{\{1\}}$ | $W_{12}^{\{1\}}$ |
| SB#5 | $W_0^{\{1\}}$ | $W_4^{\{1\}}$ | $W_8^{\{1\}}$ | $W_{12}^{\{1\}}$ |

| | SF#1 | SF#2 | SF#3 | SF#4 |
|---|---|---|---|---|
| SB#1 | $W_0^{\{1\}}$ | $W_4^{\{1\}}$ | $W_8^{\{1\}}$ | $W_{12}^{\{1\}}$ |
| SB#2 | $W_4^{\{1\}}$ | $W_8^{\{1\}}$ | $W_{12}^{\{1\}}$ | $W_0^{\{1\}}$ |
| SB#3 | $W_8^{\{1\}}$ | $W_{12}^{\{1\}}$ | $W_0^{\{1\}}$ | $W_4^{\{1\}}$ |
| SB#4 | $W_{12}^{\{1\}}$ | $W_0^{\{1\}}$ | $W_4^{\{1\}}$ | $W_8^{\{1\}}$ |
| SB#5 | $W_0^{\{1\}}$ | $W_4^{\{1\}}$ | $W_8^{\{1\}}$ | $W_{12}^{\{1\}}$ |

| | SF#1 | SF#2 | SF#3 | SF#4 |
|---|---|---|---|---|
| SB#1 | $W_0^{\{1\}}$ | $\dfrac{W_0^{\{14\}}}{\sqrt{2}}$ | $W_8^{\{1\}}$ | $\dfrac{W_8^{\{12\}}}{\sqrt{2}}$ |
| SB#2 | $\dfrac{W_0^{\{14\}}}{\sqrt{2}}$ | $W_8^{\{1\}}$ | $\dfrac{W_8^{\{12\}}}{\sqrt{2}}$ | $W_0^{\{1\}}$ |
| SB#3 | $W_8^{\{1\}}$ | $\dfrac{W_8^{\{12\}}}{\sqrt{2}}$ | $W_0^{\{1\}}$ | $\dfrac{W_0^{\{14\}}}{\sqrt{2}}$ |
| SB#4 | $\dfrac{W_8^{\{12\}}}{\sqrt{2}}$ | $W_0^{\{1\}}$ | $\dfrac{W_0^{\{14\}}}{\sqrt{2}}$ | $W_8^{\{1\}}$ |
| SB#5 | $W_0^{\{1\}}$ | $\dfrac{W_0^{\{14\}}}{\sqrt{2}}$ | $W_8^{\{1\}}$ | $\dfrac{W_8^{\{12\}}}{\sqrt{2}}$ |

LOW OVERHEAD MIMO SCHEME

CROSS-REFERENCE TO RELATED APPLICATION(S) AND CLAIM OF PRIORITY

The present application is related to U.S. Provisional Patent Application No. 61/196,015, filed Oct. 14, 2008, entitled "LOW OVERHEAD MIMO SCHEME". Provisional Patent Application No. 61/196,015 is assigned to the assignee of the present application and is hereby incorporated by reference into the present application as if fully set forth herein. The present application hereby claims priority under 35 U.S.C. §119(e) to U.S. Provisional Patent Application No. 61/196,015.

TECHNICAL FIELD OF THE INVENTION

The present application relates generally to wireless communications and, more specifically, to reducing the overhead required by various communication schemes.

BACKGROUND OF THE INVENTION

Network communication between two communication nodes can comprise overhead traffic and data traffic. Overhead traffic refers to traffic that is used to facilitate network communication. Examples of overhead traffic in wireless communication include, but are not limited to, reference signal overhead and feedback overhead. Overhead traffic and data traffic generally each consume a part of the network communication bandwidth. As the amount of overhead traffic increases, there may be a corresponding decrease in bandwidth available for data traffic.

Therefore, reducing required overhead traffic results in a corresponding increase of bandwidth for data traffic. Therefore, there is a need in the art for an improved transmission scheme. In particular, there is a need for a low overhead multiple in, multiple out (MIMO) transmission scheme that is capable of maximizing user available resources.

SUMMARY OF THE INVENTION

In one embodiment, a method is disclosed for use in a communications network that includes transmitting a set of known precodes on a plurality of subbands and storing a correlation of transmitted precodes with a time of transmission of the precodes. This method also includes receiving a set of channel quality indicators (CQI) that correspond to a time of transmission of the precodes and determining which precodes may be used in communication based upon the received CQI and the correlation of the transmitted precodes with the time of transmission of the precodes.

In another embodiment, a base station is disclosed that includes a transmitter that transmits a set of signals with known precodes on at least two subbands. This base station also includes a storage device to store a time when the set of known precodes are transmitted and a receiver to receive a set of channel quality indicators (CQI) that correspond to the time of transmission of the precodes. In addition, this base station includes a processor to determine which precodes may be used in communication based upon the received CQI and the correlation of the transmitted precodes and with time of transmission of the precodes.

In yet another embodiment, a mobile device is disclosed that comprises a receiver that receives a precoded signal, wherein the precoded signal is transmitted using a multiple in multiple out (MIMO) scheme, a processor that interprets the precoded signal, and a transmitter that transmits a channel quality indicator based upon the precoded signal, wherein the transmitter transmits the CQI determined using the precoded signal without providing feedback related to the precoded signal.

To address the above-discussed deficiencies of the prior art, it is a primary object to provide, for use in a wireless network, systems and methods of reducing overhead traffic in a wireless network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 is a table of a codebook used in the 3GPP LTE system used in several of the exemplary embodiments of the disclosure;

FIG. 14 is an example of mapping of downlink reference signals in the 3GPP LTE system according to an exemplary embodiment of the disclosure;

FIG. 15 is an example of precoding vector cycling for initialization and reset of precoding according to an exemplary embodiment of the disclosure;

FIG. 16 is an example of MIMO precoding on different subbands according to an exemplary embodiment of the disclosure;

FIG. 17 is an example of precoding vector cycling for initialization and reset of precoding using a subset of rank-1 precoders according to an exemplary embodiment of the disclosure;

FIG. 18 is another example of precoding vector cycling for initialization and reset of precoding using a subset of rank-1 precoders according to an exemplary embodiment of the disclosure;

FIG. 20 is an example of precoding vector cycling for initialization and reset of precoding using a subset of rank-1 and rank-2 precoders according to an exemplary embodiment of the disclosure;

DETAILED DESCRIPTION OF THE INVENTION

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system to reduce the amount of overhead traffic required in a communications scheme, including a wireless communications scheme.

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
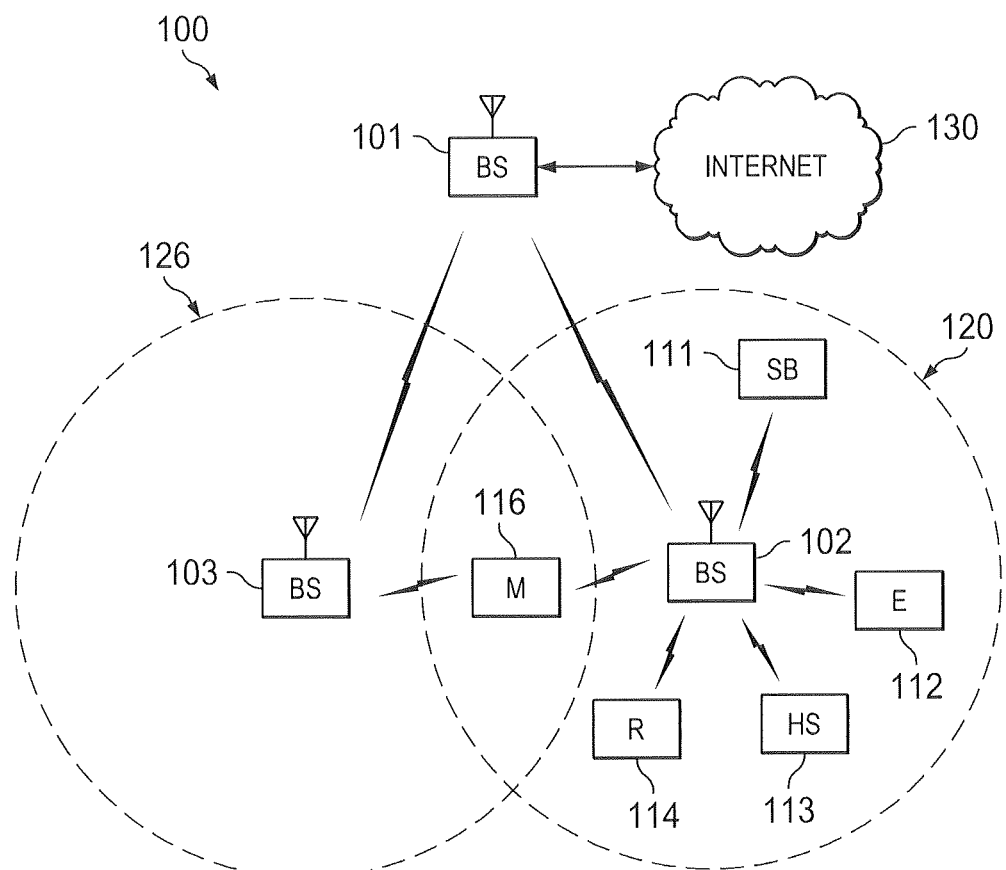
FIG. 1 illustrates an exemplary wireless network that transmits ACK/NACK messages in the uplink according to the principles of the present disclosure.

FIG. 1 illustrates exemplary wireless network 100, which transmits control messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown). Any type or configuration of base stations, including, but not limited to E-node B base stations used in third generation wireless standards, maybe used with the present systems and methods.

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
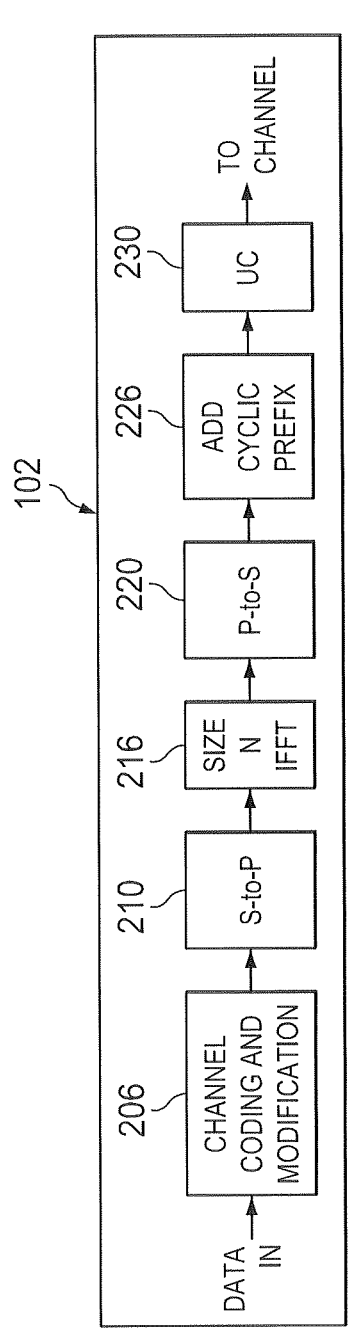
FIG. 2A is a high-level diagram of an OFDMA transmitter according to one embodiment of the present disclosure.
Figure 2B:
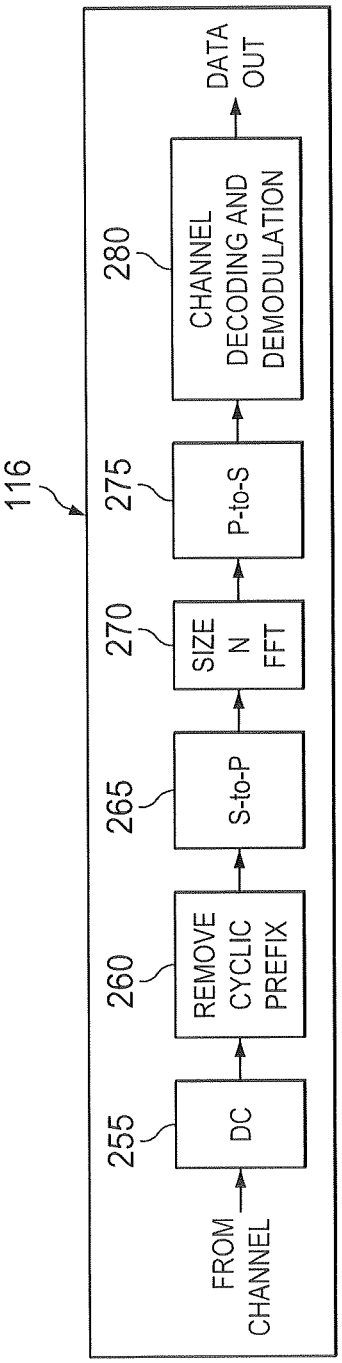
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Multiple Input Multiple Output (MIMO) schemes use multiple transmit antennas and multiple receive antennas to improve the capacity and reliability of a wireless communication channel. A MIMO system promises linear increase in capacity with K where K is the minimum of number of transmit (M) and receive antennas (N) (i.e. K=min(M,N)).

In one example, four different data streams are transmitted separately from the four transmit antennas. The transmitted signals are received at the four receive antennas. Some form of spatial signal processing is performed on the received signals in order to recover the four data streams. An example of spatial signal processing is V-BLAST which uses the successive interference cancellation principle to recover the transmitted data streams. Other variants of MIMO schemes include schemes that perform some kind of space-time coding across the transmit antennas (e.g. D-BLAST) and also beamforming schemes such as SDMA (Spatial Division Multiple Access).

The MIMO channel estimation consists of estimating the channel gain and phase information for links from each of the transmit antennas to each of the receive antennas. Therefore, the channel for M×N MIMO system consists of an N×M matrix, as shown in Equation 1 below:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \quad [\text{Eqn. 1}]$$

In Equation 1, $h_{ij}$ represents the channel gain from transmit antenna j to receive antenna i. In order to enable the estimations of the elements of the MIMO channel matrix, separate pilots are transmitted from each of the transmit antennas.

Figure 3:
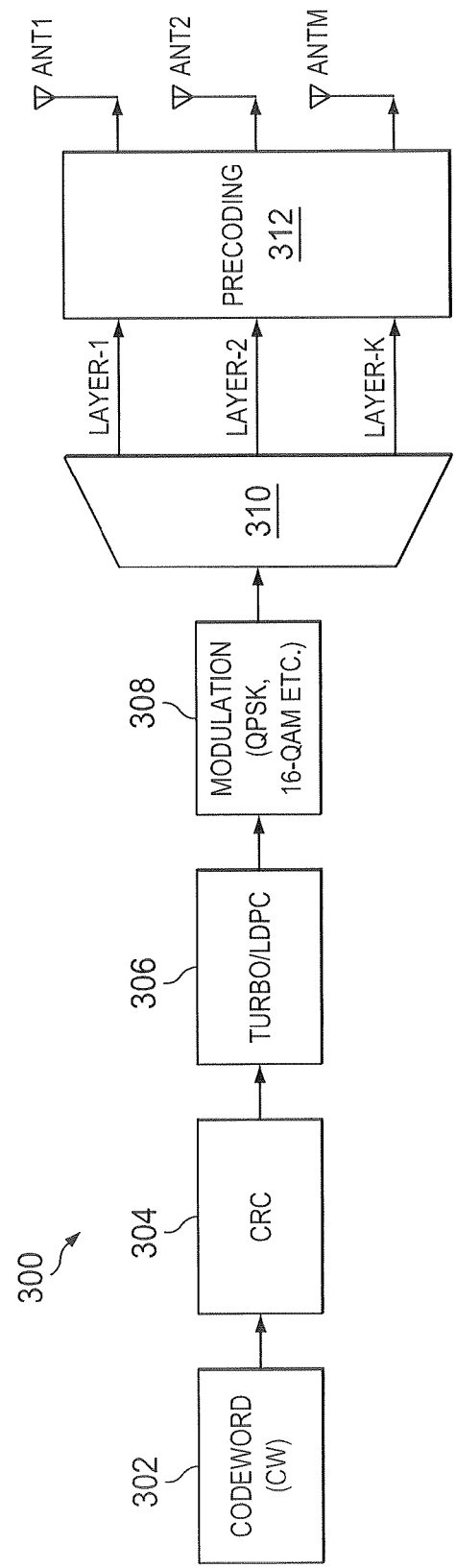
FIG. 3 illustrates an example of a single-code word MIMO transmission scheme according to an exemplary embodiment of the disclosure.

An example of a single-code word MIMO scheme 300 is given in FIG. 3. In the case of single-code word MIMO transmission, the transmission begins with the selection of a codeword (CW) in codework block 302. A cyclic redundancy check (CRC) is attached to the codeword selected in block 302 in CRC block 304. Also in scheme 300, the output from the CRC block 304 is coded using a turbo or low-density parity-check (LDPC) block 306. The output from the turbo/LDPC block 306 is then modulated in modulation block 308 using a modulation scheme known to one skilled in the art. Examples of known modulation schemes include, but are not limited to QPSK and 16-QAM. The modulated output from the modulation block 308 is demuxed in demux block 310 into a plurality of data layers. These data layers formed at the demux block 310 are then transmitted to a precoding block 312 prior to transmission. Optional precoding is applied to map K layers to M transmit antennas in precoding block 312.

Figure 4:
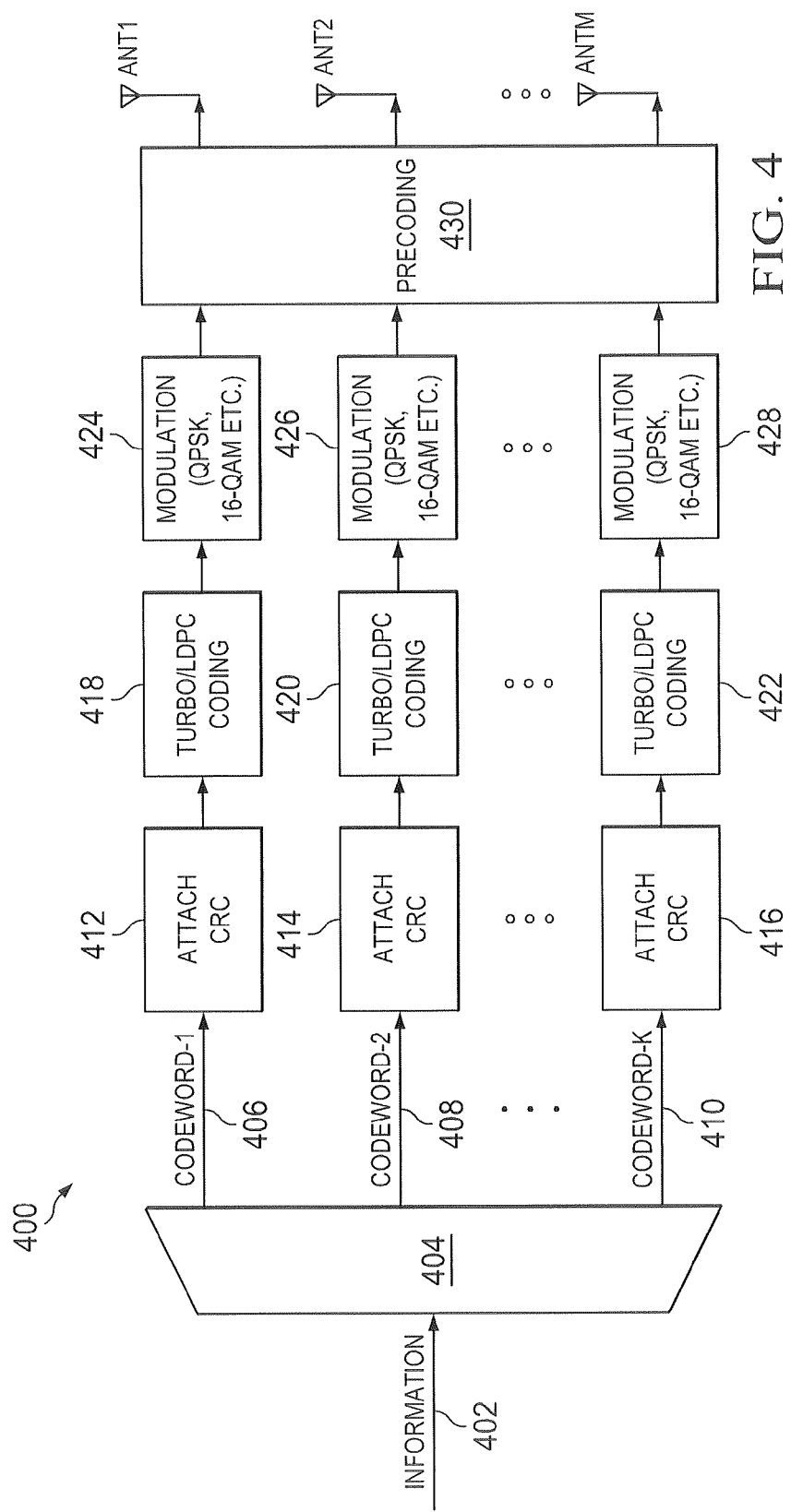
FIG. 4 illustrates an example of a multi-code word MIMO transmission scheme according to an exemplary embodiment of the disclosure.

In the case of a multiple codeword MIMO transmission 400, shown in FIG. 4, a information block 402 is de-multiplexed into smaller information blocks. In the example illustrated in FIG. 4, the information is broken up into three blocks. Codewords 406, 408, and 410 are selected for each smaller information block.

Individual CRCs are attached to these smaller information blocks in CRC blocks 412, 414, and 416 and then separate coding in blocks 418, 420, and 422 and modulation in blocks 424, 426, and 428 are performed on these smaller blocks. It should be noted that in the case of multi-code word MIMO transmissions, different modulation and coding can be used on each of the individual streams resulting in a so called PARC (per antenna rate control) scheme. Also, multi-code word transmission allows for more efficient post-decoding interference cancellation because, a CRC check can be performed on each of the code words before the code word is cancelled from the overall signal. In this way, only correctly received code words are cancelled avoiding any interference propagation in the cancellation process. The output from the modulation blocks 424, 426, and 428 are then transmitted to optional precoding block 430 prior to transmission.

One of the applications of the currently disclosed systems and methods is in a 3GPP LTE system. In a 3GPP LTE system, a maximum of two codewords are used for transmission of 2, 3 or 4 MIMO layers as shown in FIGS. 5, 6, and 7.

Figure 5:
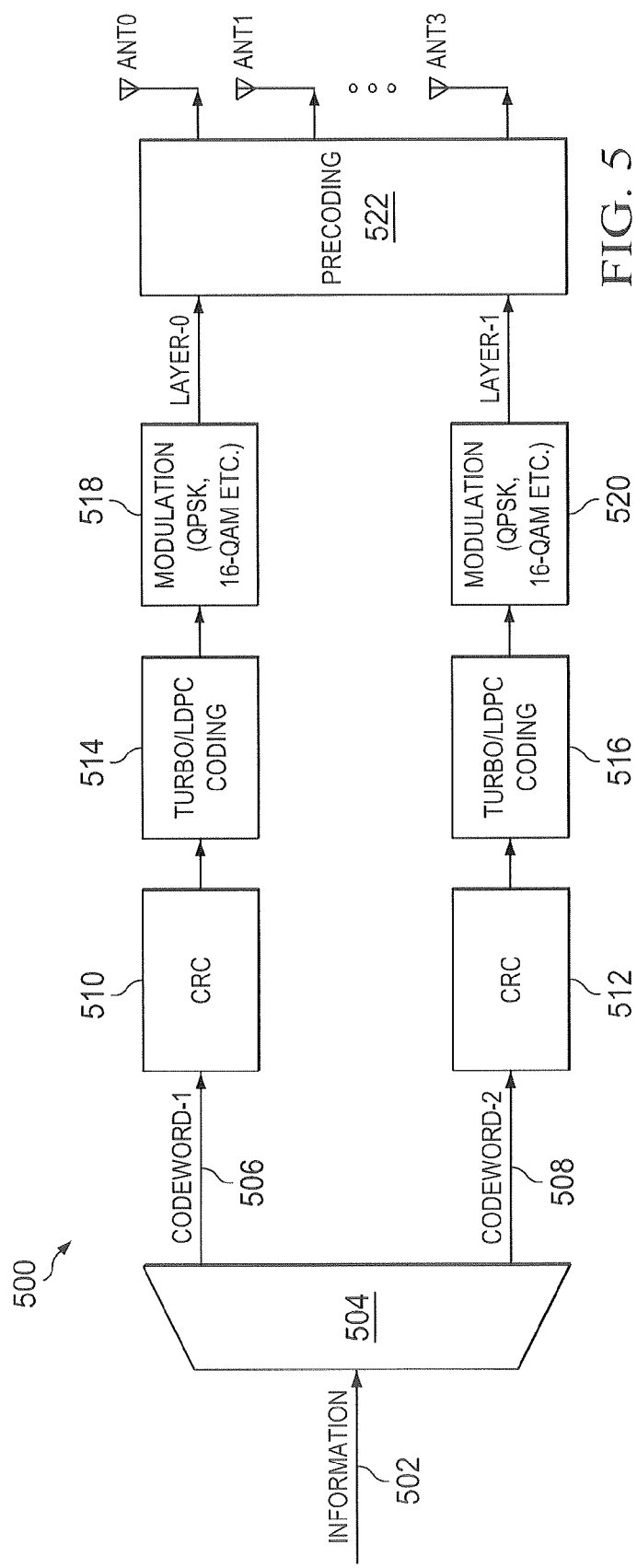
FIG. 5 illustrates an example of a multi-code word MIMO scheme for 2-layers transmission in the 3GPP LTE (Third Generation Partnership Project Long Term Evolution) system according to an exemplary embodiment of the disclosure.

As shown in FIG. 5, for a rank-2 or 2 layers transmission 500, codeword-1 (CW1) is transmitted from Layer-0 while a codeword-2 (CW2) is transmitted from Layer-1. In FIG. 5, information 502 is placed into demux block 504. A first codeword (CW1) 506 and a second codeword (CW2) 508 are selected. CW1 506 is merged with a first output from the demux block 504 and placed into the CRC block 510. CW2 508 is merged with a second output from the demux block 504 and placed into the CRC block 512. The output from CRC block 510 is coded in Turbo/LDPC coding block 514 and modulated in modulation block 518. The output from CRC block 512 is coded in Turbo/LDPC coding block 516 and modulated in modulation block 520. In this rank-2 embodiment, the output from modulation block 518 is assigned to layer 0, and the output from the modulation block 520 is assigned to layer 1. The output from the modulation blocks 518, 520 is then precoded in precoding block 522 prior to being transmitted using an antenna.

Figure 6:
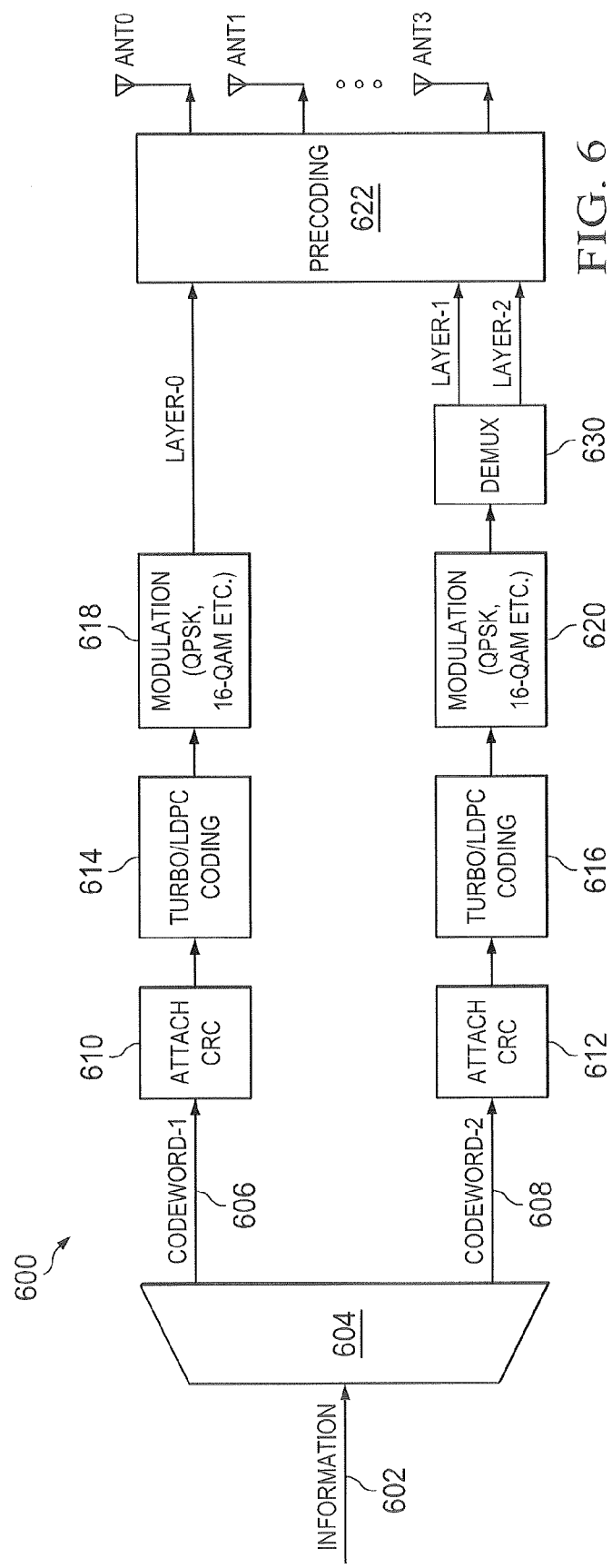
FIG. 6 illustrates an example of a multi-code word MIMO scheme for 3-layers transmission in the 3GPP LTE (Third Generation Partnership Project Long Term Evolution) system according to an exemplary embodiment of the disclosure.

As shown in FIG. 6, for a rank-3 or 3 layers transmission 600, a codeword-1 (CW1) is transmitted from Layer-0 only while a codeword-2 CW2 is transmitted from Layer-1 and Layer-2. In FIG. 6, information 602 is placed into demux block 604. A first codeword (CW1) 606 and a second codeword (CW2) 608 are selected. CW1 606 is merged with a first output from the demux block 604 and placed into the CRC block 610. CW2 608 is merged with a second output from the demux block 604 and placed into the CRC block 612. The output from CRC block 610 is coded in Turbo/LDPC coding block 614 and modulated in modulation block 618. The output from CRC block 612 is coded in Turbo/LDPC coding block 616 and modulated in modulation block 620. In this rank-3 embodiment, the output from modulation block 618 is assigned to layer 0, and the output from the modulation block 620 broken up in demux block 630. A first output from demux block 630 is assigned to Layer 1, and a second output from demux block 630 is assigned to Layer 2. The output from the modulation block 618 and demux block 630 are then precoded in precoding block 622 prior to being transmitted using an antenna.

Figure 7:
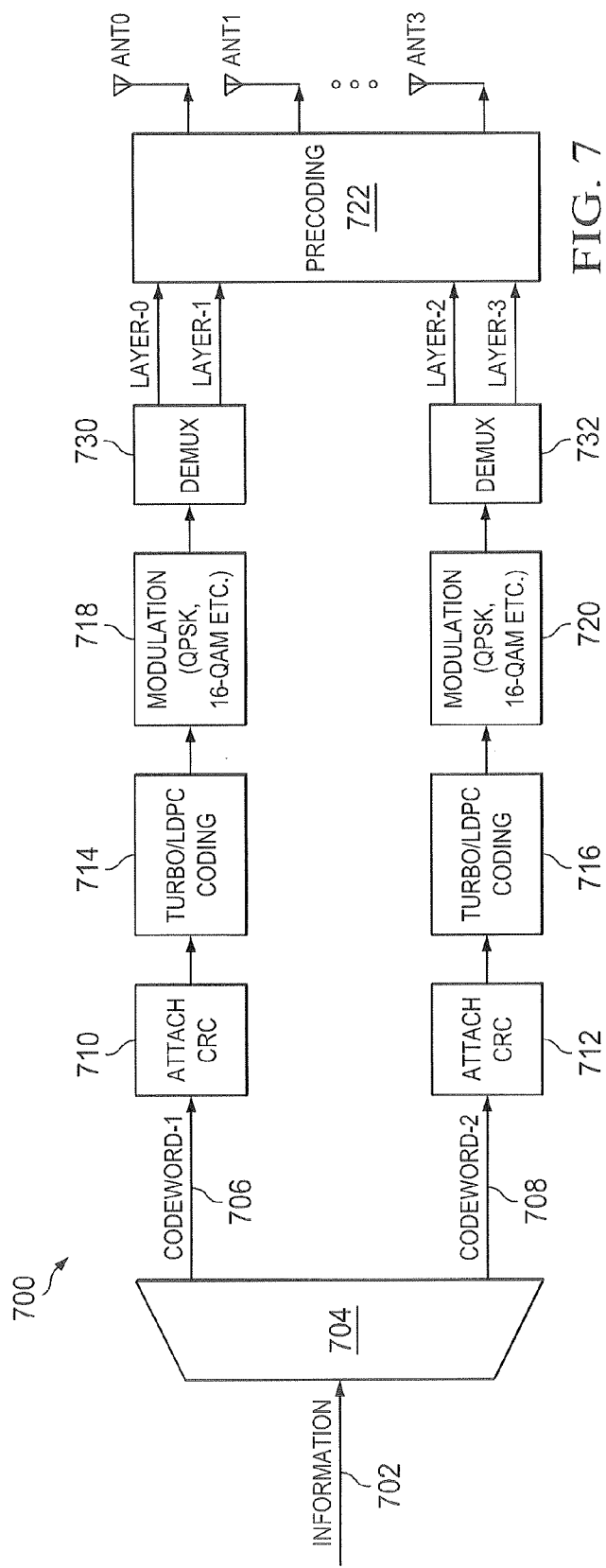
FIG. 7 illustrates an example of a multi-code word MIMO scheme for 4-layers transmission in the 3GPP LTE (Third Generation Partnership Project Long Term Evolution) system according to an exemplary embodiment of the disclosure.

As shown in FIG. 7, for a 4 layers transmission 700, codeword-1 (CW1) is transmitted from Layer-0 and Layer-1 while a codeword-2 (CW2) is transmitted from Layer-2 and Layer-3. In FIG. 7, information 702 is placed into demux block 704. A first codeword (CW1) 706 and a second codeword (CW2) 708 are selected. CW1 706 is merged with a first output from the demux block 704 and placed into the CRC block 710. CW2 708 is merged with a second output from the demux block 704 and placed into the CRC block 712. The output from CRC block 710 is coded in Turbo/LDPC coding block 714 and modulated in modulation block 718. The output from CRC block 712 is coded in Turbo/LDPC coding block 716 and modulated in modulation block 720. In this rank-2 embodiment, the output from modulation block 718 is broken up in demux block 730. A first output from demux block 730 is assigned to layer 0, and a second output from demux block 630 is assigned to layer 1. The output from the modulation block 720 broken up in demux block 732. A first output from demux block 732 is assigned to layer 2, and a second output from demux block 732 is assigned to layer 3. The output from the demux blocks 730, 732 is then precoded in precoding block 722 prior to being transmitted using an antenna.

Figure 8:
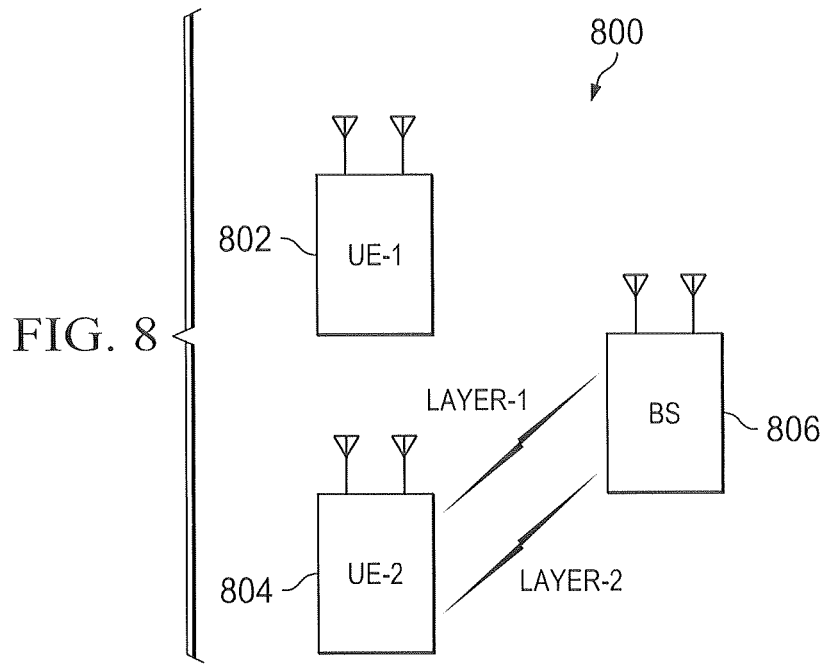
FIG. 8 illustrates an example of a single-user MIMO system according to an exemplary embodiment of the disclosure.

FIG. 8 is an example 800 of a single-user MIMO system. In the case of single-user MIMO, all the MIMO layers are transmitted from a BS 806 to a second user equipment (UE-2) 804. None of the data is transmitted to the first user equipment (UE-1) 802. The embodiment illustrated in FIG. 8 illustrates that through MIMO communications, a plurality of layers may be transmitted to a single UE devices. It is understood that the disclosed systems and methods may be used to reduce the overhead traffic required to maintain communications between the BS 806 and the UE-2 804.

Figure 9:
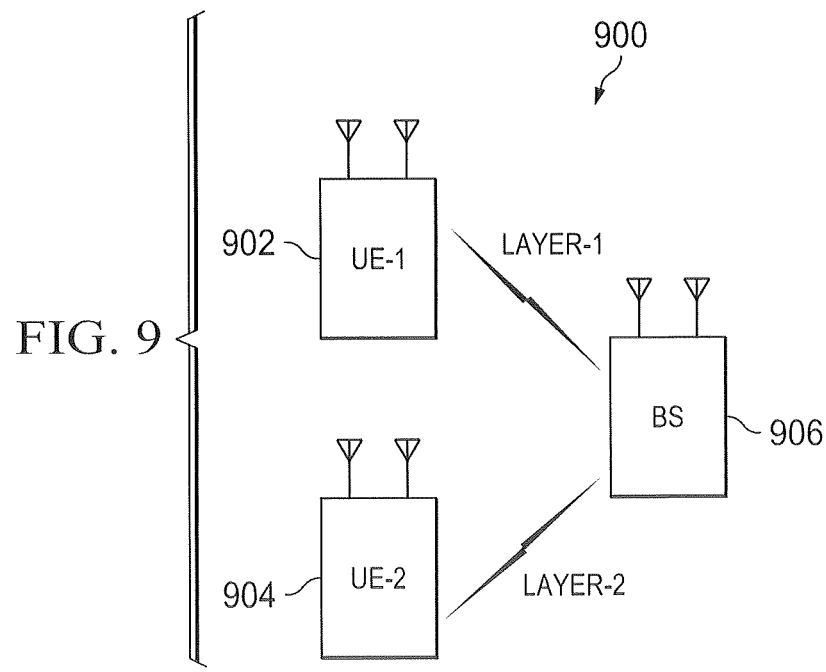
FIG. 9 illustrates an example of a multi-user MIMO system according to an exemplary embodiment of the disclosure.

FIG. 9 is an example 900 of a multi-user MIMO system. As shown in FIG. 9, the MIMO layers are shared among multiple UEs. In the example illustrated in FIG. 9, BS 906 transmits a first layer to UE-1 902 and transmits a second layer to UE-2 904. The embodiment illustrated in FIG. 9 illustrates that through MIMO communications, a plurality of layers may be transmitted to a plurality of UE devices. It is understood that the disclosed systems and methods may be used to reduce the overhead traffic required to maintain communications between the BS 906 and the UE 902, 904. While two UE devices are illustrated in FIG. 9, it is explicitly understood that any number of UE devices may be present in FIG. 9. It is further understood that a plurality of layers may be transmitted to a plurality of UE devices. For instance, in one alternative embodiment, a plurality of layers may be transmitted to UE 902 while a single layer is transmitted to UE 904. In other alternative embodiments, a plurality of layers may be transmitted to UE 902 and UE 904. In yet other embodiments, a plurality of UE devices may be present each of which is in communication with a BS, with each of the plurality of UE devices using at least one communication layer with the BS 906.

In a closed-loop MIMO precoding system, for each transmit antenna size, there is a set of precoding matrices that are constructed and known to both the BS and the UE. This set of known precoding matrices may be referred to as the "codebook" and denoted as P={P1, ..., PL}. Here L=2q denotes the size of the codebook and q is the number of (feedback) bits needed to index the codebook. Once the codebook is specified for a MIMO system, the receiver observes a channel realization, selects the best precoding matrix (codeword) to be used at the moment, and feedback the index of the codeword to the transmitter.

Figure 10:
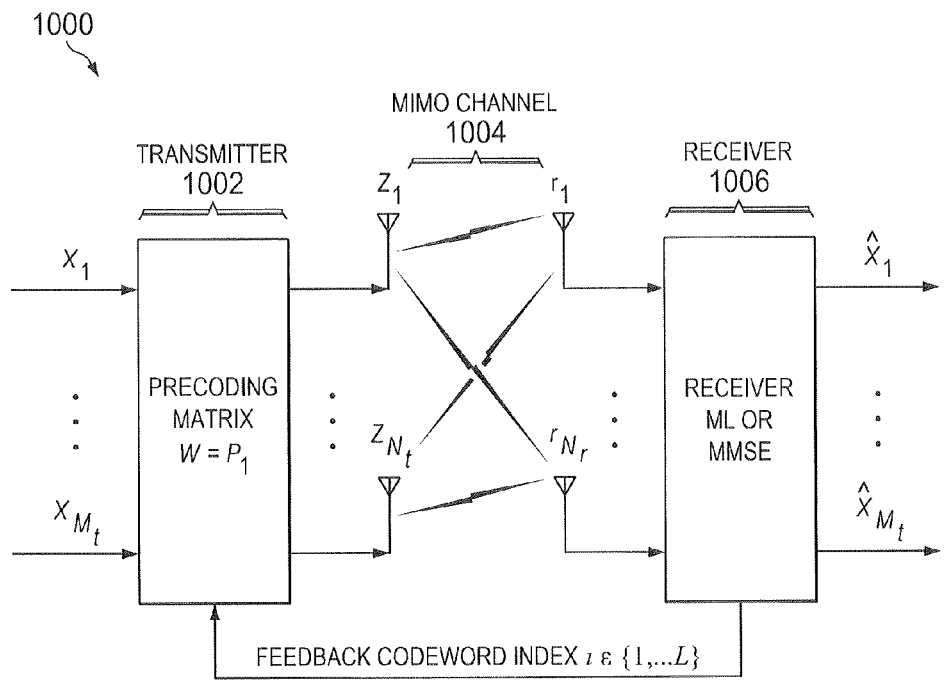
FIG. 10 illustrates MIMO feedback based precoding according to an exemplary embodiment of the disclosure.

One idea of the limited feedback precoding MIMO system is illustrated in FIG. 10. In the example 1000 shown in FIG. 10, a transmitter 1002 uses a precoding matrix over a MIMO channel 1004 to transmit data to a receiver 1006. The receiver 1006 transmits a feedback codeword index to the transmitter 1002. This feedback is overhead traffic. Reducing the feedback traffic would result in a corresponding increase of available bandwidth for communication between the transmitter 1002 and the receiver 1006.

Figure 11:
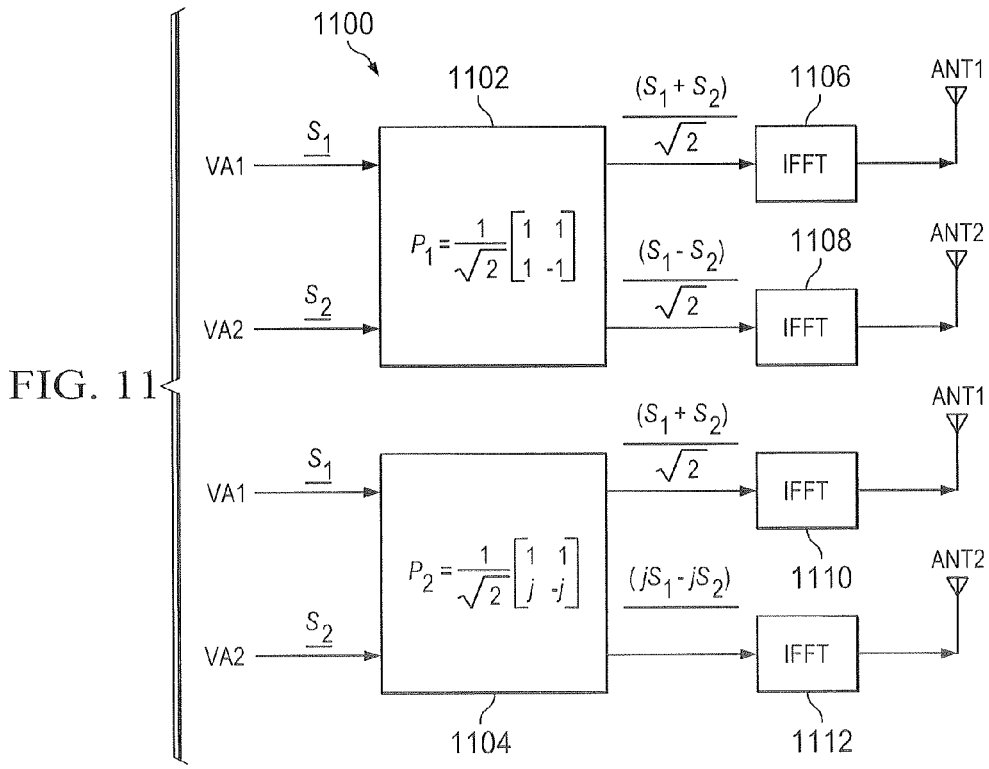
FIG. 11 illustrates MIMO precoding according to an exemplary embodiment of the disclosure.

An optional pre-coding employs a unitary pre-coding before mapping the data streams to physical antennas as is shown in FIG. 11. This creates a set of virtual antennas (VA) or MIMO layers before the pre-coding. In this case, each of the codewords is potentially transmitted from all the physical transmit antennas. Two examples of unitary precoding matrices, P1 and P2 for the case of two transmit antenna can be illustrated as shown in Equation 2 below:

$$P_1 = \frac{1}{\sqrt{2}}\begin{bmatrix} 1 & 1 \\ 1 & -1 \end{bmatrix}, \quad P_2 = \frac{1}{\sqrt{2}}\begin{bmatrix} 1 & 1 \\ j & -j \end{bmatrix}$$ [Eqn. 2]

Assuming modulation symbols S1 and S2 are transmitted at a given time from stream 1 and stream 2, respectively. Then the modulation symbols after precoding with matrix P1 and P2 can be written as equations 3 and 4 respectively, below:

$$T_1 = P_1 \begin{bmatrix} S_1 \\ S_2 \end{bmatrix} = \frac{1}{\sqrt{2}}\begin{bmatrix} 1 & 1 \\ 1 & -1 \end{bmatrix} \times \begin{bmatrix} S_1 \\ S_2 \end{bmatrix} = \frac{1}{\sqrt{2}}\begin{bmatrix} S_1 + S_2 \\ S_1 - S_2 \end{bmatrix}$$ [Eqn. 3]

$$T_2 = P_2 \begin{bmatrix} S_1 \\ S_2 \end{bmatrix} = \frac{1}{\sqrt{2}}\begin{bmatrix} 1 & 1 \\ j & -j \end{bmatrix} \times \begin{bmatrix} S_1 \\ S_2 \end{bmatrix} = \frac{1}{\sqrt{2}}\begin{bmatrix} S_1 + S_2 \\ jS_1 - jS_2 \end{bmatrix}$$ [Eqn. 4]

To illustrate the use of Equations 3 and 4, FIG. 11 shows the transmission of a plurality of data streams from a plurality of virtual antennas. FIG. 11 illustrates a system 1100 where two precoding blocks 1102, 1104 accept input from a first and second virtual antenna. The two precoding blocks 1102, 1104 each prepare a separate layer that is encoded using an inverse fast Fourier transform (IFFT). For instance, first precoding block 1102 may use a first matrix P1, and transmit data to a first IFFT block 1106 and a second IFFT block 1108. The second precoding block 1104 may use a second matrix P2 and transmit data to a third IFFT block 1110 and a fourth IFFT block 1112. First IFFT block 1106 and third IFFT block 1110 may transmit data using a first antenna, and second IFFT block 1108 and fourth IFFT block 1112 may transmit data using a second antenna.

In the example shown in FIG. 11, the symbol $$T_{11} = \frac{(S_1 + S_2)}{\sqrt{2}}$$

and $$T_{12} = \frac{(S_1 + S_2)}{\sqrt{2}}$$

may be transmitted from antenna 1 and antenna 2, respectively, when precoding is done using precoding matrix P1. Similarly, the symbol $$T_{21} = \frac{(S_1 + S_2)}{\sqrt{2}}$$

and $$T_{22} = \frac{(jS_1 - jS_2)}{\sqrt{2}}$$

will respectively be transmitted from antenna 1 and antenna 2 when precoding is done using precoding matrix P2 as shown in FIG. 11. It should be noted that precoding is done on an OFDM subcarrier level before the IFFT operation as illustrated in FIG. 11.

An example of precoding is discrete Fourier transform (DFT) based on Fourier precoding. A Fourier matrix is a N×N square matrix with entries given by Equation 5 below:

$$P_{mn} = \frac{1}{\sqrt{N}} * e^{j2\pi mn/N} \quad m, n = 0, 1, \ldots (N-1)$$ [Eqn. 5]

A 2×2 Fourier matrix can be expressed as shown in Equation 6 below:

$$P_2 = \frac{1}{\sqrt{2}} * \begin{bmatrix} 1 & 1 \\ 1 & e^{j\pi} \end{bmatrix} = \frac{1}{\sqrt{2}} * \begin{bmatrix} 1 & 1 \\ 1 & -1 \end{bmatrix}$$ [Eqn. 6]

Similarly, a 4×4 Fourier matrix can be expressed as Equation 7 below:

$$P_4 = \frac{1}{\sqrt{4}} * \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix}$$ [Eqn. 7]

$$= \frac{1}{\sqrt{4}} * \begin{bmatrix} 1 & 1 & 1 & 1 \\ 1 & j & -1 & -j \\ 1 & -1 & 1 & -1 \\ 1 & -j & -1 & j \end{bmatrix}$$

Other forms of precoding include matrices obtained using Householder equation. An example of a 4×4 Householder matrix is given below in Equation 8:

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix} (0.1) \quad [\text{Eqn. 8}]$$

In Equation 8, the following equation may be used:

$$u_0^T = [1\ -1\ -1\ -1] \quad [\text{EQN. 9}]$$

An example of HH 4-Tx antennas MIMO precoding used in the 3GPP LTE system is given in table 1200 shown in FIG. 12. This example is intended to be exemplary, as modifications may be made to this table consistent with systems and methods disclosed herein.

Figure 13:
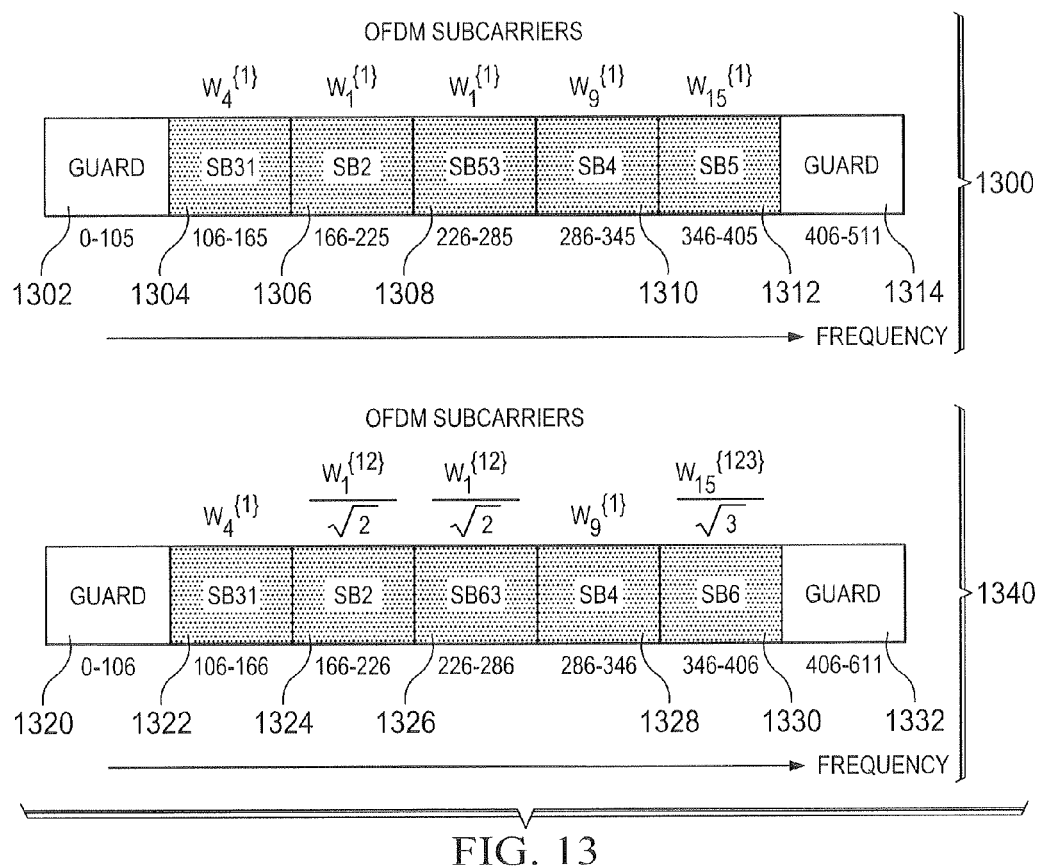
FIG. 13 is an example of MIMO precoding on different subbands according to an exemplary embodiment of the disclosure.

The precoding used for MIMO transmission needs to be fedback by the UE to the BS. The precoding feedback information consists of precoding-matrix or column identity. Moreover, due to frequency-selective fading in an OFDM system, the optimal precoding over different subbands can be different as shown in FIG. 13. Therefore, the precoding information can be sent on a subband basis. In the example of a scheme 1300 as shown in FIG. 13, the 300 used subcarriers are divided into 5 subbands of 60 subcarriers each. In this embodiment, rank-1 transmission is assumed over all the subbands. The precoders used for rank-1 transmission in SB1, 2, 3, 4 and 5 are $W_4^{\{1\}}, W_1^{\{1\}}, W_1^{\{1\}}, W_9^{\{1\}}$ and $W_{15}^{\{1\}}$, respectively, in FIG. 13.

When a system can support 4×4 MIMO, rank-4 (4 MIMO layers) transmissions are not always desirable. The MIMO channel experienced by the UE generally limits the maximum rank that can be used for transmission. In general for weak users in the system, a lower rank transmission is preferred over a high rank transmission from a throughput perspective. Moreover, due to frequency-selective fading, optimal rank may be different on different subbands. Therefore, for optimal performance, a UE need to feedback the rank information on a subband basis as shown in a scheme 1340 also shown in FIG. 13. In the example of scheme 1340, the transmission on SB1, 2, 3, 4 and 5 use a rank-1, 2, 2, 1 and 3, respectively.

The precoding matrix indication (PMI) and rank feedback on a subband basis can result in significant feedback overhead. For example, and assuming 4-bits per subband for PMI and 2-bits per subband for rank, the total overhead for feedback on 5 subbands is 30 bits. For larger system bandwidths, the system needs to support a larger number of subbands resulting in even larger feedback overhead. Also, for finer granularity of PMI/rank feedback in frequency, the overhead also increases. Therefore, there is a need to improve the PMI and rank feedback mechanisms that reduces the overhead.

The downlink reference signals mapping for 4-Tx antennas ports in a 3GPP (3rd Generation Partnership Project) LTE (Long Term Evolution) system is shown in FIG. 14 chart 1400. The notation $R_p$ is used to denote a resource element used for reference signal transmission on antenna port p. It can be noted that the density on antenna ports 2 and 3 is half the density on antenna ports 0 and 1.

The reference signal overhead per antenna port for ports 0 and 1 is 4.76% while the density is 2.38% for antenna ports 2 and 3. The total reference signal overhead for the four ports is 14.28%. This represents a significant overhead in the system. When the number of antenna ports increases beyond 4, the reference signal overhead also increases correspondingly. Moreover, the receiver needs to provide feedback on the preferred precoding matrix (PM) on a subband basis to the transmitter. This result in significant signaling overhead from the receiver to the transmitter. Therefore, there is a need to reduce both the reference signal and feedback overhead in a MIMO system.

A scheme that reduces both the reference signal overhead as well as the feedback overhead for MIMO communications is disclosed herein. In a first embodiment, the precoding used for transmission is initialized and reset by cycling through all or a subset of precoders. In the example of FIG. 15, the transmitter cycle through all the rank-1 precoders from table 1200 of FIG. 12. The cycling continues until all or a selected subset of precoders are used on all or a subset of the subbands (SBs). The reference signal is also precoded. Therefore, even with 4-TX antennas transmission, a single precoded reference signal is transmitted for rank-1 transmissions. The receivers can make channel quality (CQI) measurements on different subbands and report back to the transmitter.

The CQI feedback timing is such that transmitter can link the received CQI to the precoders used by the transmitter. For example in FIG. 16, the transmitter schedules a receiver in the subband#1 in subframe (k+1), where k is the subframe, based on the CQI this receiver reported for subband#1 and SF#5. Since the transmitter used $W_4^{\{1\}}$ precoder in subband#1 and SF#5 based on which the receiver reported CQI, the transmitter uses the same precoder $W_4^{\{1\}}$ for transmission to this receiver in SB#1 in subframe (k+1). Note that the CQI is valid for the precoder that was used in measuring the CQI. Using the same principle, the transmitter schedules transmissions to other receivers in the other subbands. In some embodiments, it is understood that k may be an integer greater than 6.

It is understood that a single receiver can be allocated more than one subband using different precoders. In this case, when there is no transmission within a given subband of a subframe, the transmitter transmits only the reference signal using a precoder that is not used for transmission in the current subframe. This is to provide more precoders choice for receivers making measurements on different subbands as shown in FIG. 16. For example, in SB#3 and subframe#(k+1), there is no data transmission.

It is also understood that the transmitter uses a precoder $W_6^{\{1\}}$ for reference signal transmission only which is not used for transmission to any receiver within the subframe# (k+1). Similarly, precoder $W_3^{\{1\}}$ which is not used for transmission to any receiver within the subframe#(k+2), is used for reference signal only transmission within SB#2 in subframe# (k+2). In subframe#(k+3), two subbands, SB#3 and SB#4 are used for reference signal transmission only and so on.

Referring to FIG. 16, a transmission is performed to a first receiver using precoder $W_1^{\{1\}}$ on SB#2 in subframe#(k+1). A second receiver makes CQI measurements on SB#2 in subframe#(k+1) and reports back the CQI to the transmitter. The transmitter then schedules the second receiver in SB#2 in subframe#(k+5) using the same precoder $W_1^{\{1\}}$ that the receiver assumed in CQI measurements. Note that the second receiver may not be aware of the exact precoder used in SB#2 in subframe#(k+1) when the second receiver made the CQI measurement. However, transmitter keeps track of the precoders used in different subbands and different subframe. When a CQI is reported by a receiver, the transmitter can link the CQI to the precoder used in a given subband and subframe.

A third receiver makes CQI measurement in SB#3 in subframe#(k+1) and reports back the CQI to the transmitter. The transmitter transmitted reference signal only in SB#3 in subframe#(k+1) using precoder $W_6^{\{1\}}$. The transmitter then schedules the third receiver in SB#3 in subframe#(k+6) using the same precoder $W_6^{\{1\}}$ that the receiver assumed in CQI measurements.

In one embodiment of the present disclosure, a BS keeps track of precoders that are used at any particular time using a table stored in a computer readable medium. The BS receives CQI measurements that the BS can correlate to the CQI measurements by accessing the computer readable medium. In some embodiments, the BS can create a table of CQI measurements, SB, and precoder used. This table can then be ranked to determine the best CQI for a particular UE device. A table 1600 can be used to schedule receivers is illustrated in FIG. 16. FIG. 16 shows the location of reference and data transmissions 1602 as well as the location of the reference signal 1604 in use according to results created by the cycling of precoders.

An example of precoding vector cycling for initialization and reset of precoding using a subset of rank-1 precoders $\{W_0^{\{1\}}, W_4^{\{1\}}, W_8^{\{1\}}, W_{12}^{\{1\}}\}$ is shown in a table 1700 illustrated in FIG. 17. In a frequency-selective channel, the optimal precoder can be different for different frequency subbands. The cycling shown in FIG. 17 assures that each of the four precoders in the set $\{W_0^{\{1\}}, W_4^{\{1\}}, W_8^{\{1\}}, W_{12}^{\{1\}}\}$ is transmitted from all the subbands.

In another embodiment shown in FIG. 18, the precoders are first cycled in frequency and then in time as illustrated by A table 1800. FIG. 18 is intended to illustrate an example of precoding vector cycling for initialization and reset of precoding using a subset of rank-1 precoders $\{W_0^{\{1\}}, W_4^{\{1\}}, W_8^{\{1\}}, W_{12}^{\{1\}}\}$.

Figure 19:
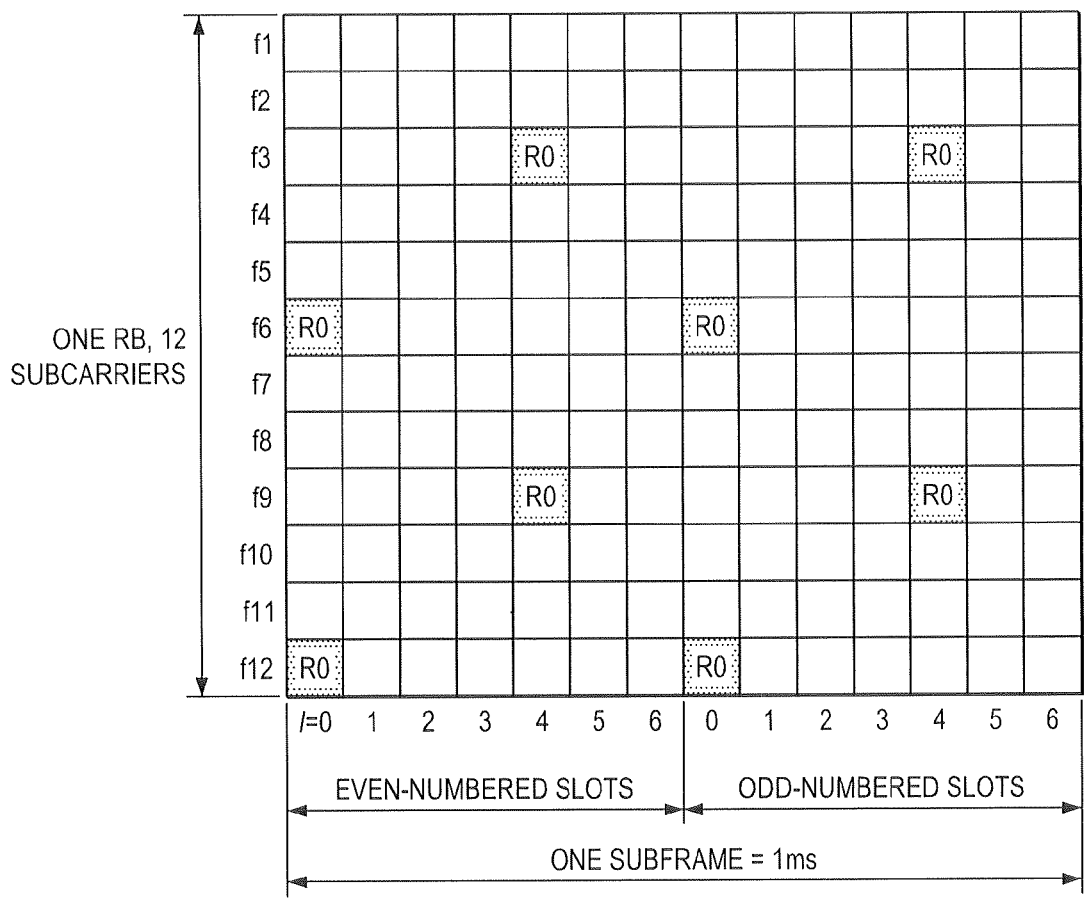
FIG. 19 is an example of a mapping of downlink reference signals for rank-1 transmissions according to an exemplary embodiment of the disclosure.

The mapping of downlink reference signals for rank-1 transmissions according to the principles of the current disclosure is shown in a table 1900 shown in FIG. 19. It should be noted that a single reference signal is transmitted irrespective of the number of transmit antennas used for rank-1 transmission.

In another embodiment shown in FIG. 20 a table 2000, a subset of precoders consisting both rank-1 and rank-2 precoders $$\left\{W_0^{\{1\}}, \frac{W_0^{\{14\}}}{\sqrt{2}}, W_8^{\{1\}}, \frac{W_0^{\{12\}}}{\sqrt{2}}\right\}$$

are used for transmission. The receivers make CQI measurements assuming the used precoders and report back the CQI to the transmitter. The transmitter then schedules the receivers based on the received CQI. In general, for some receivers, a given combination of rank and precoder will turn out to be good on certain subbands and these receivers will report a higher CQI on these subbands. In the case of a proportional fair scheduler, these receivers will likely be scheduled on subbands where they report a higher CQI.

Figure 21:
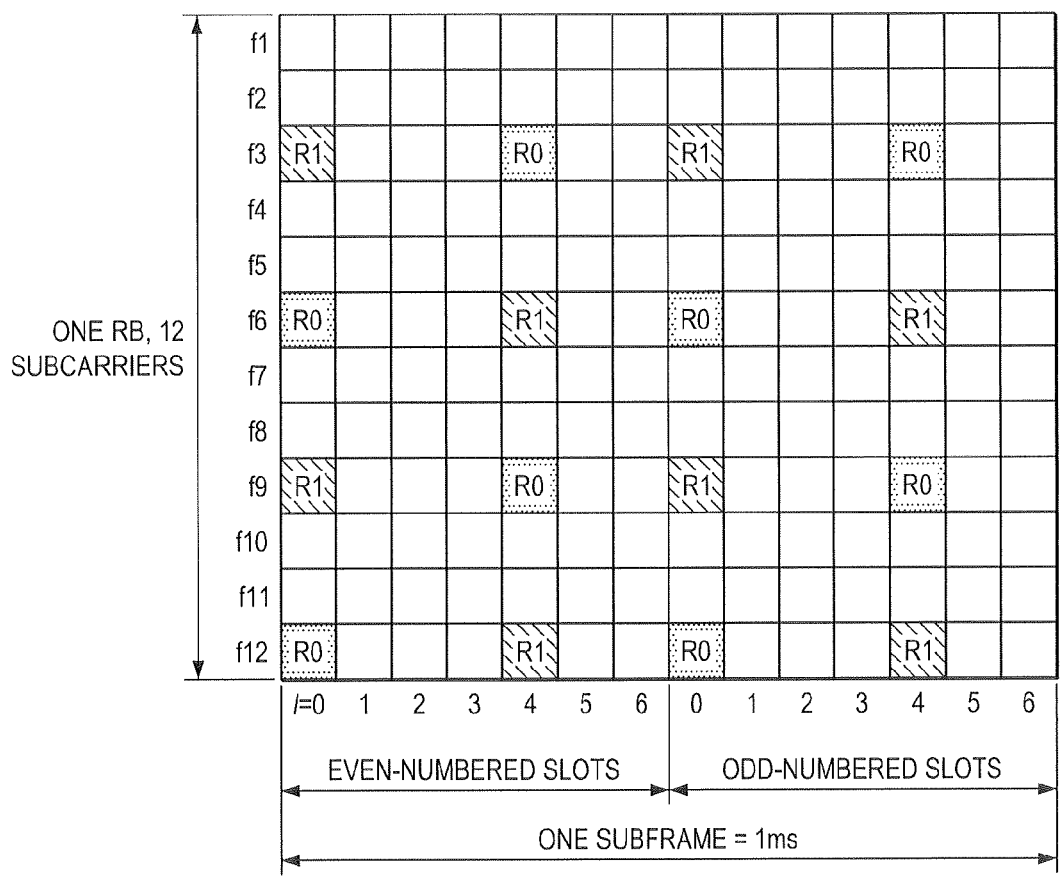
FIG. 21 is an example of mapping of downlink reference signals for rank-2 transmissions according to an exemplary embodiment of the disclosure.

The mapping of downlink reference signals for rank-2 transmissions according to the principles of the current disclosure is shown in table 2100 shown in FIG. 21. Note that for rank-1 transmissions such as transmissions on SB#1, 3 and 5 in subframe#1 in FIG. 20, the reference signal mapping of rank-1 shown in FIG. 19 is used.

Figure 22:
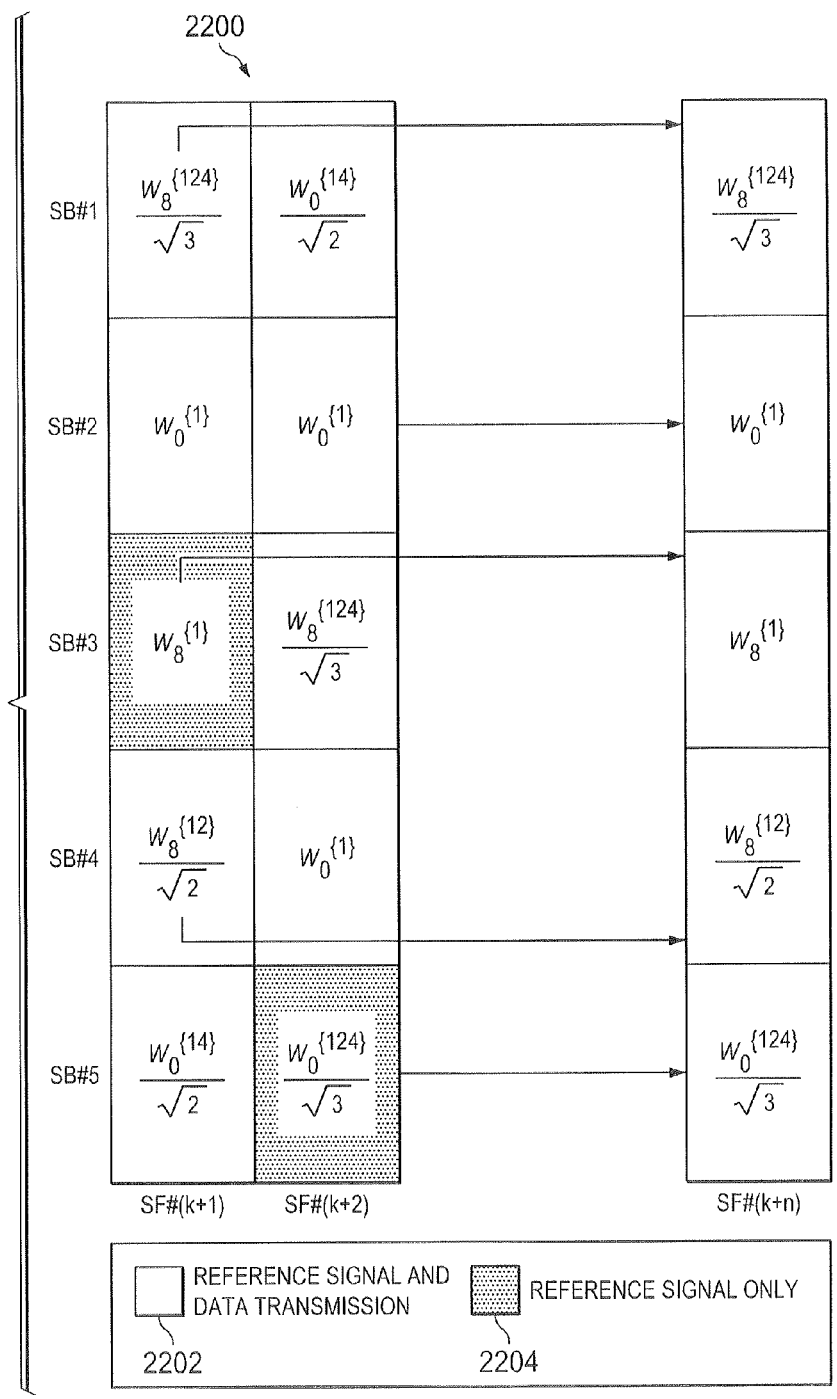
FIG. 22 is an example of MIMO precoding for rank-1, rank-2 and rank-3 transmissions according to an exemplary embodiment of the disclosure.

In another embodiment shown in FIG. 22 table 2200, a subset of precoders consisting rank-1, rank-2 and rank-3 precoders $$\left\{W_0^{\{1\}}, \frac{W_0^{\{14\}}}{\sqrt{2}}, \frac{W_0^{\{124\}}}{\sqrt{3}}, W_8^{\{1\}}, \frac{W_8^{\{12\}}}{\sqrt{2}}, \frac{W_8^{\{124\}}}{\sqrt{3}}\right\}$$

is used for transmission. The receivers make CQI measurements assuming the used precoders and report back the CQI to the transmitter. The transmitter then schedules the receivers based on the received CQI. Note that the transmitter keeps track of the rank and precoder used in each subband and subframe and, therefore, can relate the received CQI to the rank and precoder used. In general, for some receivers, a given combination of rank and precoder will turn out to be good on certain subbands and these receivers will report a higher CQI on these subbands. In the case of a proportional fair scheduler, these receivers will be likely to be scheduled on subbands where the receivers report a higher CQI. In the example of FIG. 22, the receivers scheduled in subframe#(k+n) are based on CQI measurements in subframe#(k+1) and subframe#(k+2), where n is any integer.

Figure 23:
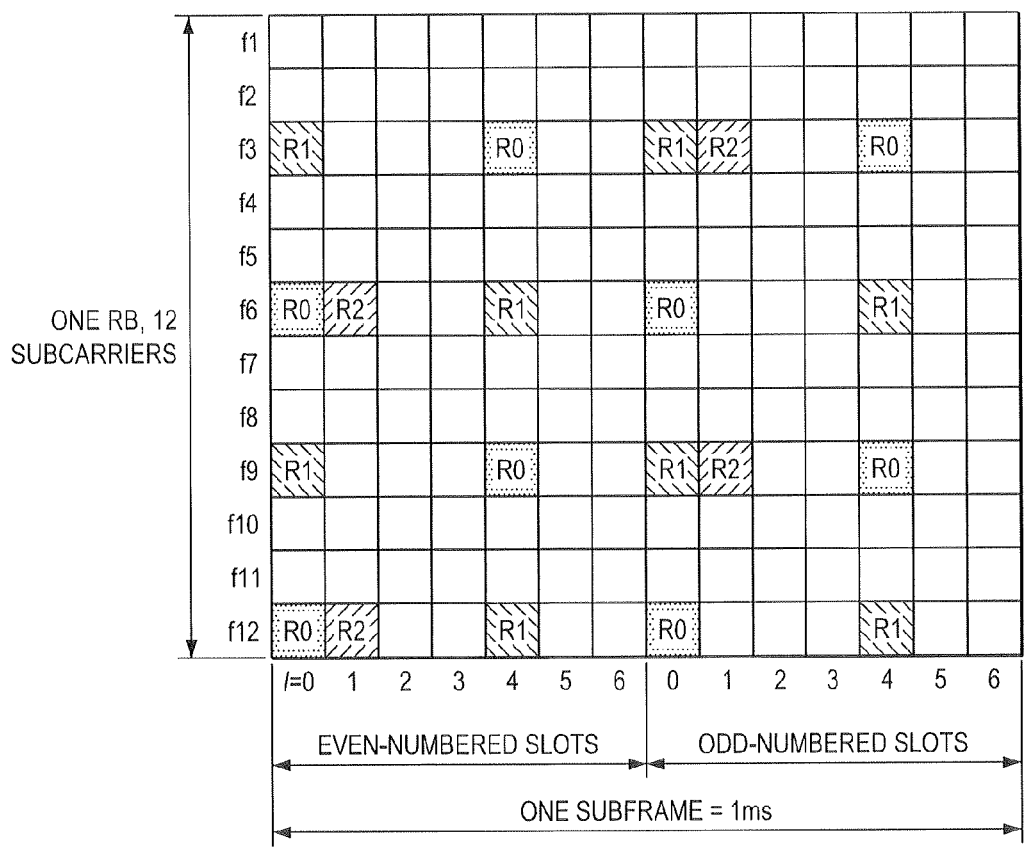
FIG. 23 is an example of mapping of downlink reference signals for rank-3 transmissions according to an exemplary embodiment of the disclosure.

The mapping of downlink reference signals for rank-3 transmissions according to the principles of the disclosure is shown in a table 2300 in FIG. 23. Note that for rank-1 transmissions such as transmissions on SB#2 in subframe#(k+1) in FIG. 22, the reference signal mapping of rank-1 shown in Figure is used. Similarly, for rank-2 transmissions such as transmissions on SB#5 in subframe#(k+1) in FIG. 22, the reference signal mapping of rank-2 shown in FIG. 21 is used.

Figure 24:
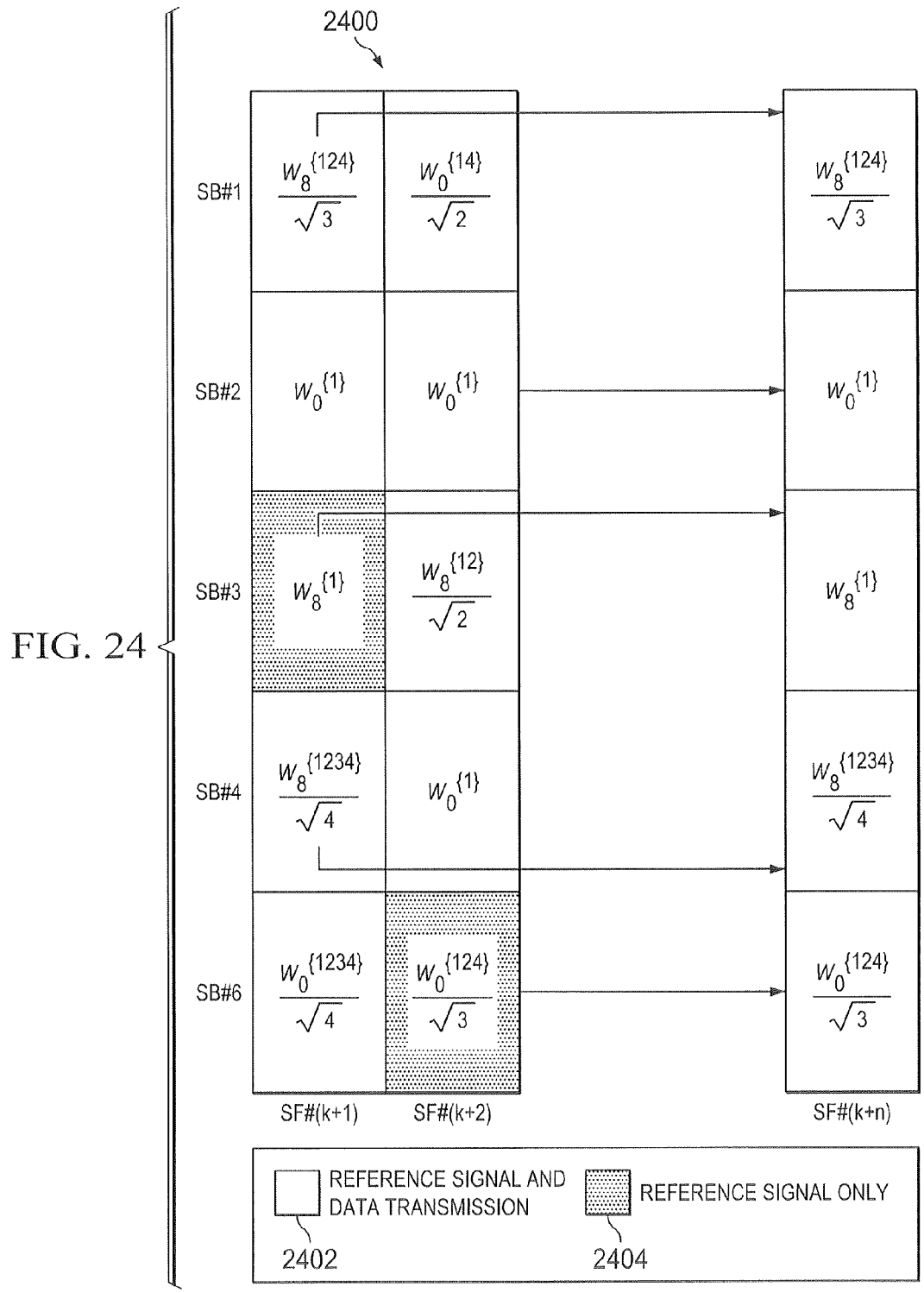
FIG. 24 is an example of MIMO precoding for rank-1, rank-2, rank-3 and rank-4 transmissions according to an exemplary embodiment of the disclosure.

In another embodiment of the disclosure shown in a table 2400 shown in FIG. 24, a subset of precoders consisting rank-1, rank-2, rank-3 and rank-4 precoders $$\left\{W_0^{\{1\}}, \frac{W_0^{\{14\}}}{\sqrt{2}}, \frac{W_0^{\{124\}}}{\sqrt{3}}, \frac{W_0^{\{1234\}}}{\sqrt{4}}, W_8^{\{1\}}, \frac{W_8^{\{12\}}}{\sqrt{2}}, \frac{W_8^{\{124\}}}{\sqrt{3}}, \frac{W_0^{\{1234\}}}{\sqrt{4}}\right\}$$

is used for transmission. The receivers make CQI measurements assuming the used precoders and report back the CQI to the transmitter. The transmitter then schedules the receivers based on the received CQI. Note that the transmitter keeps track of the rank and precoder used in each subband and subframe and, therefore, can relate the received CQI to the rank and precoder it used. The receivers need not be aware of the actual precoders used. This is because the reference signals used for both CQI measurements and data demodulation are precoded.

In general, for some receivers, a given combination of rank and precoder will turn out to be good on certain subbands and these receivers will report a higher CQI on these subbands. In the case of a proportional fair scheduler, these receivers will be likely to be scheduled on subbands where the receivers report a higher CQI. In the example of FIG. 24, the receivers scheduled in subframe#(k+n) are based on CQI measurements in subframe#(k+1) and subframe#(k+2).

Figure 25:
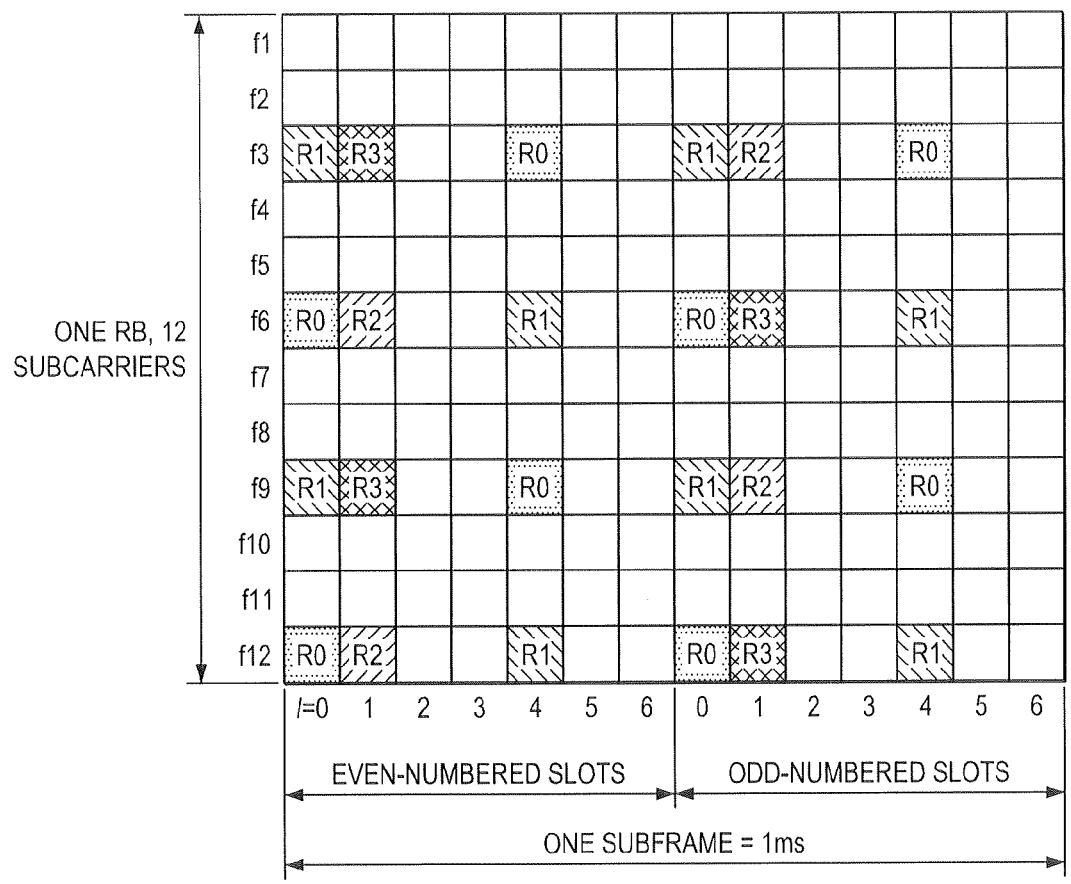
FIG. 25 is an example of mapping of downlink reference signals for rank-4 transmissions according to an exemplary embodiment of the disclosure.

The mapping of downlink reference signals for rank-4 transmissions according to the principles shown in FIG. 25. It is understood that for rank-1 transmissions such as transmissions on SB#2 in subframe#1 in FIG. 24, the reference signal mapping of rank-1 shown in FIG. 19 is used. Similarly, for rank-2 transmissions such as transmissions on SB#1 in subframe#(k+2) in FIG. 24, the reference signal mapping of rank-2 shown in FIG. 21 is used. Moreover, for rank-3 transmissions such as transmissions on SB#1 in subframe#(k+1) in FIG. 24, the reference signal mapping of rank-3 shown in FIG. 23 is used.

Figure 26:
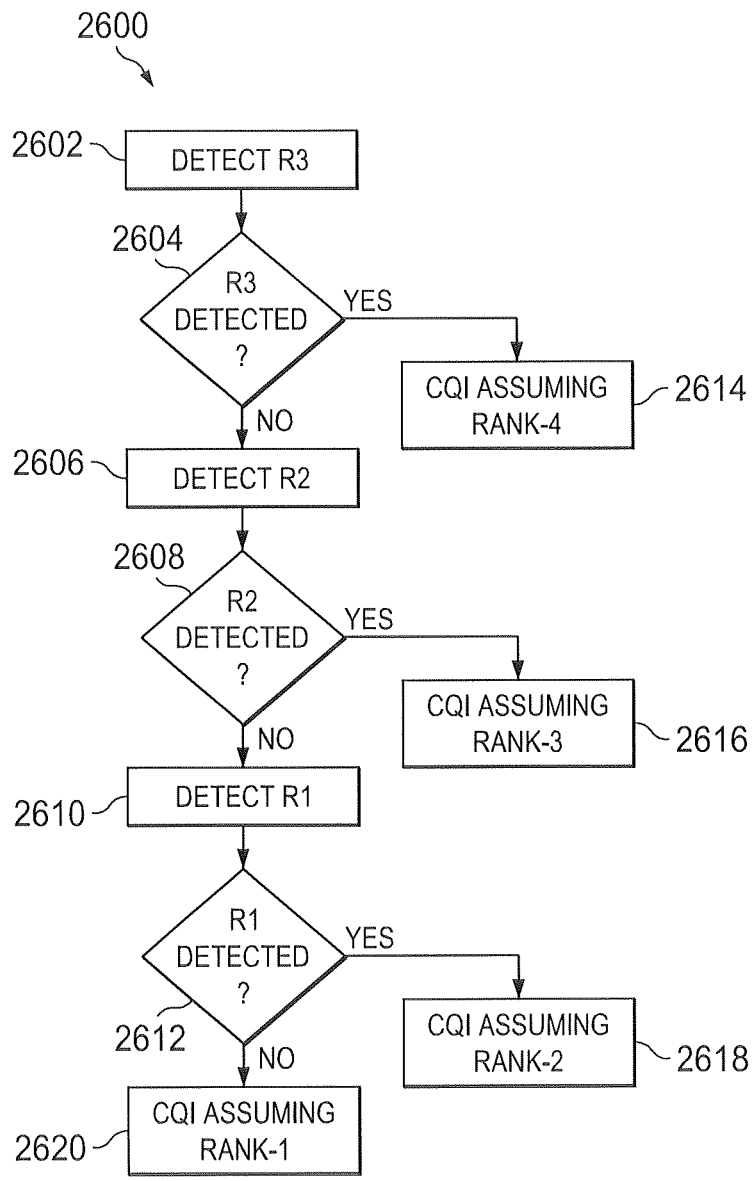
FIG. 26 is a flow diagram illustrating the detection of transmission rank using the reference signals and calculation of CQI assuming the detected rank according to an exemplary embodiment of the disclosure.

A flow chart 2600 showing detection of transmission rank using the reference signals and calculation of CQI assuming the detected rank is given in FIG. 26. The transmission rank is determined by detection of the presence or absence of the reference signal for the corresponding rank. This can be achieved by using certain sequences for reference signal transmission such as a Pseudo-Noise (PN) sequence. Also, the reference signals for different layers transmitted are orthogonal in time-frequency. Therefore, the receiver can try to detect these pre-known patterns at the corresponding location and compare the result of detection against a threshold. Also, when a rank greater than 1 is detected, the receiver may send a CQI for each layer separately.

In the flowchart 2600 shown in FIG. 2608, there is an attempt to detect R3 in block 2602. In decision block 2604, if R3 is detected, it can be assumed that rank 4 is present in block 2614. If there is no R3 detected, then there is an attempt to detect R2 in block 2606. In decision block 2608, if R2 is detected, it can be assumed that rank 3 is present in block 2616. If there is no R2 detected, then there is an attempt to detect R1 in block 2610. In decision block 2612, if R1 is detected it can be assumed that rank 2 is present in block 2618. If there is no R1 detected, then rank 1 can be determined to be present in block 2620.

Figure 27:
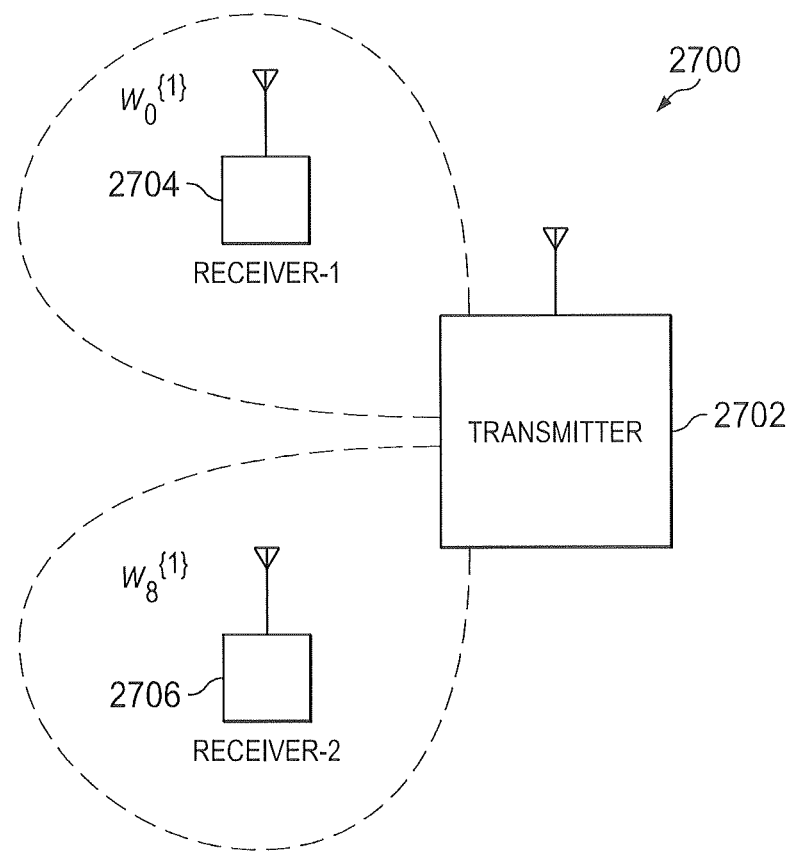
FIG. 27 is an example of Spatial-Division Medium Access (SDMA) or Multi-user MIMO according to an exemplary embodiment of the disclosure.

In another embodiment of the current invention shown in FIG. 27, simultaneous transmission is performed to more than one receiver using the same time-frequency resources. The orthogonality of signals is enabled by using different precoders also referred to as different beams for transmission to multiple users on the same resources. This type of transmissions is referred to as spatial division multiple access (SDMA) or multi-user MIMO. In the example shown in FIG. 27, a receiver-1 2704 is served using precoder $W_0^{\{1\}}$ while a receiver-2 2706 is served using precoder $W_8^{\{1\}}$ by a transmitter 2702. These two precoders create two quasi-orthogonal beams for simultaneous transmissions to the two receivers.

Figure 28:
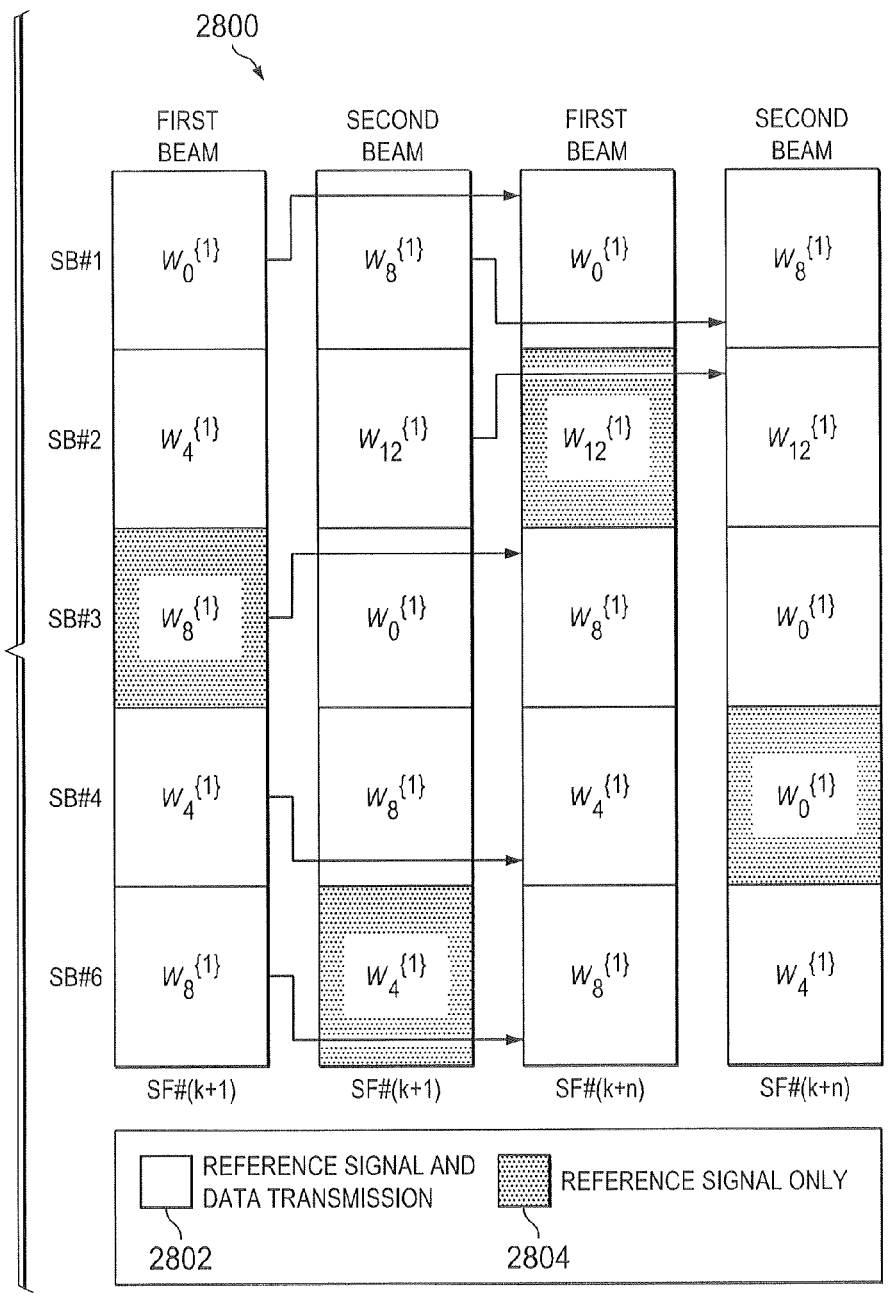
FIG. 28 is an example of SDMA or multi-user MIMO precoding transmissions according to an exemplary embodiment of the disclosure.

An example of SDMA or multi-user MIMO using a subset codebook $\{W_0^{\{1\}}, W_4^{\{1\}}, W_8^{\{1\}}, W_{12}^{\{1\}}\}$ is shown in FIG. 28. Transmission over two beams or simultaneous transmission to two receivers in the same resources is assumed. In the case of SDMA or multi-user MIMO, the transmission rank from the receiver perspective is assumed as 1, (i.e., single rank reception). However, the principles of the disclosure also apply to the case where the rank of each receiver in SDMA or multi-user MIMO can be greater than 1. In the embodiment of FIG. 28, scheduling of receivers in subframe#(k+n) based on CQI measurements in subframe#(k+1). Table 2800 of FIG. 28 shows both the reference signal and data transmission 2802 and the reference signal only 2804.

Figure 29:
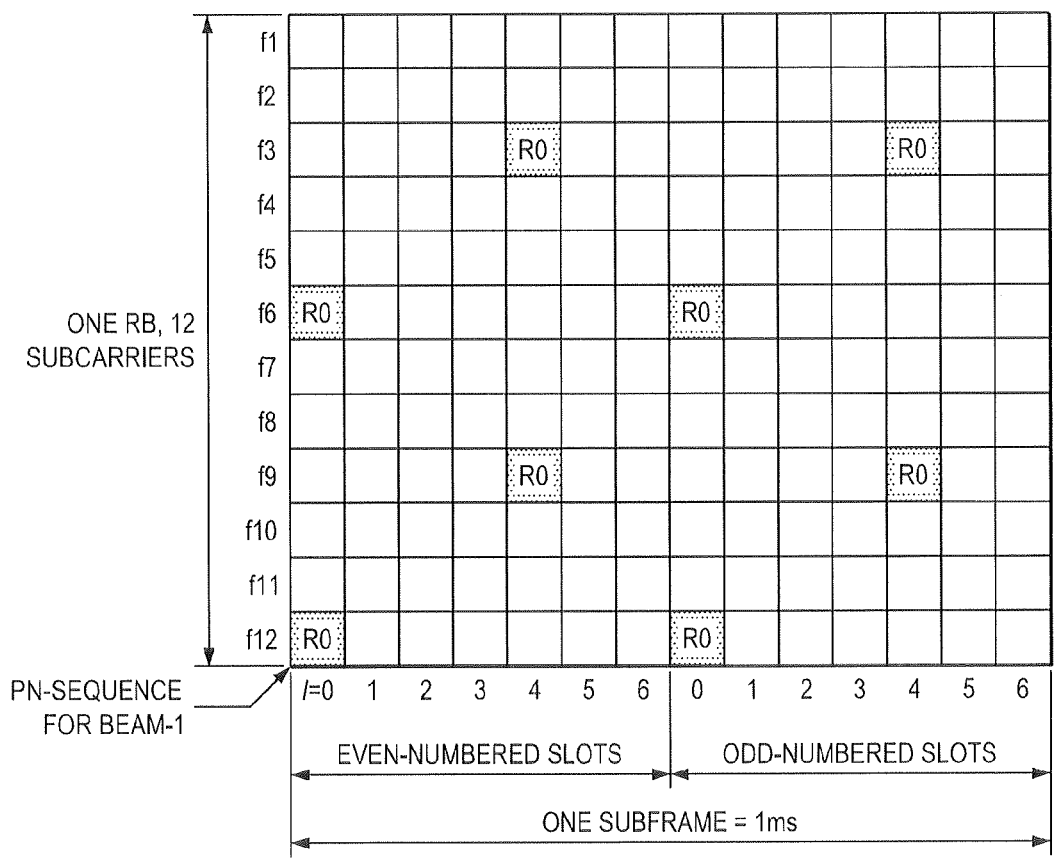
FIG. 29 is an example of the mapping of reference signals for transmissions on beam-1 in SDMA according to an exemplary embodiment of the disclosure.
Figure 30:
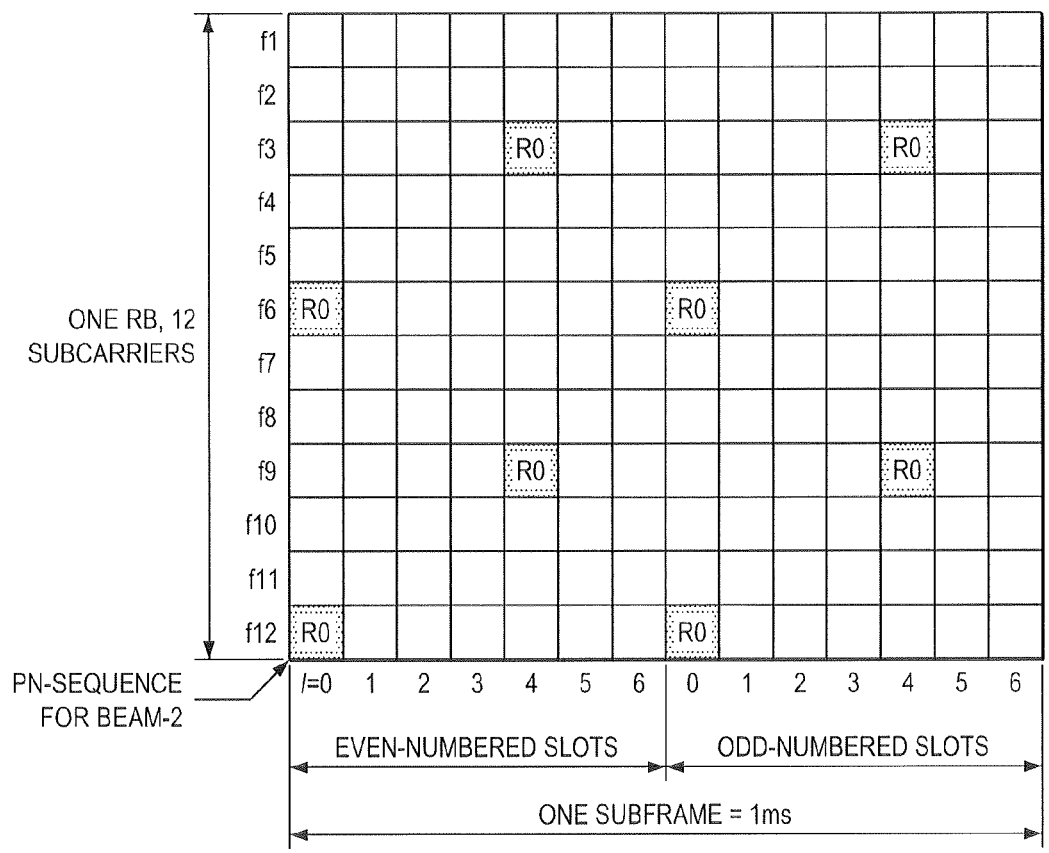
FIG. 30 is an example of the mapping of reference signals for transmissions on beam-2 in SDMA according to an exemplary embodiment of the disclosure.

In the case of SDMA or multi-user MIMO with rank-1 receptions, the reference signals for beam-1 and beam-2 are transmitted as rank-1 transmissions as shown in table 2900 of FIG. 29 and table 3000 of FIG. 30. Tables 2900 and 3000 show reference signals transmission for beam-1 and beam-2 respectively. In order for the receivers to help determine the preferred beam, the reference signals can be scrambled by a beam-specific PN-sequence. The receivers can then make CQI measurements on each of the beams received by descrambling the reference signals by the beam specific PN-sequence. The receivers then feed the CQI back to the transmitter on one or more received beams. Note that a PN-sequence is used as an example here. Other sequences such as Zadoff-Chu (ZC) sequences, Generalized Chirp Like (GCL) sequences or computer generated sequences can be used as reference signals for different beams.

Figure 31:
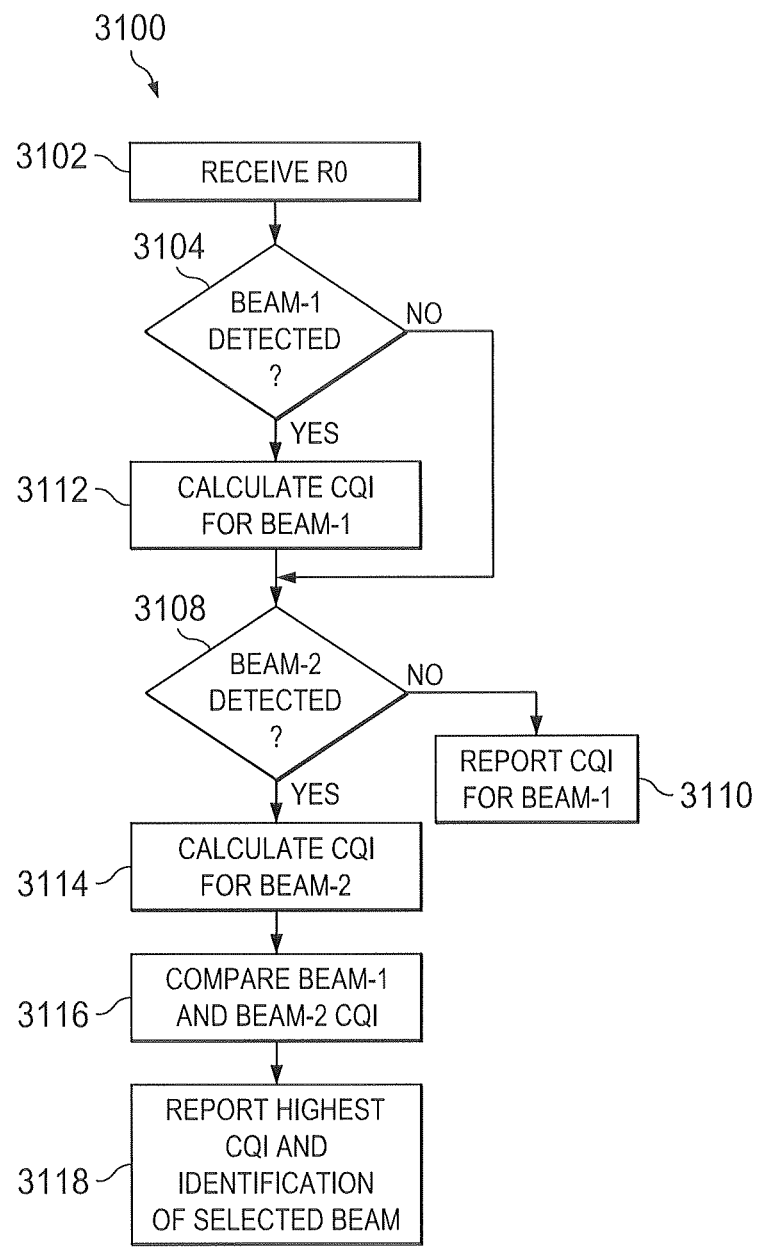
FIG. 31 is a flow diagram illustrating the detection of the preferred beam and CQI reporting according to an exemplary embodiment of the disclosure.

An example of a flow chart 3100 showing detection of the preferred beam and CQI reporting is shown in FIG. 31. As the reference signals for different beams use different sequences, the receiver can detect the different beams transmitted and can also calculate the CQI on the transmitted beams. According to the flow-chart 3100 of FIG. 31, the receiver can also determine its preferred beam. The information on the preferred beam, (i.e., that is, beam identity along with the corresponding CQI) can be feedback to the transmitter.

In the flowchart 3100 illustrated by FIG. 31, R0 is received in block 3102. In decision block 3104, there is a determination if Beam-1 has been detected. If Beam-1 has been detected, the CQI is calculated in block 3112 and then Beam-2 is attempted to be detected in decision block 3108. If Beam-1 has not been detected, Beam-2 is attempted to be detected in decision block 3108 without calculating the CQI of beam-1. If Beam-2 is not detected in decision block 3108, the CQI of Beam-1 is reported in block 3110. If beam-2 is detected in decision block 3108, the CQI for beam-2 is calculated in block 3114. The CQI of Beam-1 and Beam-2 is then compared in block 3116, and the highest CQI and the ID of the selected beam is then determined and reported in block 3118. It is understood that if Beam-2 is detected and Beam-1 is not, the CQI for Beam-2 will be reported in block 3118 without the need for a comparison in block 3116.

It is expressly understood that the systems and methods disclosed herein may be used for both asynchronous and synchronous communications. In some embodiments of asynchronous mode, a time component may be transmitted in conjunction with other information, such as CQI. In some embodiments of synchronous mode, only information, such as CQI information, may be sent.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of reducing the transmission overhead, the method comprising:
    transmitting signals precoded using a plurality of precoders on a plurality of subbands, each of the signals precoded by one of the precoders and transmitted on one of the subbands;
    storing, for each of the precoders, a subband and a subframe that each of the precoders were used to form stored subband and subframe information;
    receiving a set of channel quality indicators (CQIs);
    identifying a set of the precoders that correspond to the received CQIs, respectively, based on the stored subband and subframe information, wherein identifying the set of precoders comprises identifying a precoder in the precoders that corresponds to a CQI in the received CQIs based on the subband and the subframe the precoder was used, to form an identification;
    determining one or more of the precoders that are usable for communication based upon the received CQIs and the set of the precoders that correspond to the received CQIs; and
    scheduling the precoder for use in a data transmission to a receiver in a device having sent the CQI based on the identification.

2. The method of claim 1, wherein a base station is used to transmit the signals precoded using the precoders.

3. The method of claim 1, wherein the precoders are obtained from a codebook.

4. The method of claim 3, wherein at least one of the precoders corresponds to a particular number of antenna ports.

5. The method of claim 1, wherein each of the signals precoded using one of the precoders are also transmitted on one of a set of subframes.

6. The method of claim 1, wherein the communications network is a wireless communications network.

7. The method of claim 6, wherein the signals include at least one reference signal.

8. The method of claim 7, wherein the communications network uses a multiple in multiple out (MIMO) transmission scheme.

9. A base station comprising:
a transmitter configured to transmit signals precoded using a plurality of precoders on a plurality of subbands, each of the signals precoded by one of the precoders and transmitted on one of the subbands;
a storage device configured to store, for each of the precoders, a subband and a subframe that each of the precoders were used to form stored subband and subframe information;
a receiver configured to receive a set of channel quality indicators (CQIs); and
a processor configured to:
identify a set of the precoders that correspond to the received CQIs, respectively, based on the stored subband and subframe information including to identify a precoder in the precoders that corresponds to a CQI in the received CQIs based on the subband and the subframe the precoder was used, to form an identification,
determine one or more of the precoders that are usable for communication based upon the received CQI and the set of the precoders that correspond to the received CQIs, and
schedule the precoder for use in a data transmission to a receiver in a device having sent the CQI based on the identification.

10. The base station of claim 9, wherein the base station is an Enhanced-node B (E-node-B).

11. The base station of claim 9, wherein the signals include at least one reference signal.

12. The base station of claim 9, wherein the base station is configured to receive a plurality of CQIs from a plurality of user equipment devices.

13. The base station of claim 12, wherein at least one of the precoders corresponds to a particular number of antenna ports.

14. The base station of claim 12, wherein the transmitter is configured to transmit the signals precoded using the precoders on all available subbands.

15. A mobile device comprising:
a receiver configured to receive a precoded signal, wherein the precoded signal is precoded using a precoder and transmitted using a multiple in multiple out (MIMO) scheme;
a processor configured to interpret the precoded signal; and
a transmitter configured to transmit a channel quality indicator (CQI) based upon the precoded signal,
wherein the receiver is configured to receive a subsequent data transmission that was precoded using the precoder without the transmitter having provided feedback related to the precoder used to precode the precoded signal,
wherein the received precoded signal is one of a plurality of precoded signals, each of the plurality of precoded signals precoded using one of a plurality of precoders and transmitted on one of a plurality of subbands, and
wherein the precoder is selected for the subsequent data transmission from among the plurality of precoders based upon the transmitted CQI and the precoder being identified as corresponding to the transmitted CQI based on a correlation stored, for each of the precoders, between the precoders and a subband and a subframe that each of the precoders were used.

16. The mobile device of claim 15, wherein the mobile device is configured to determine which beam among a plurality of beams in the MIMO scheme is preferred.

17. The mobile device of claim 15, wherein the mobile device is configured to determine a number of transmission layers without a dedicated reference signal from a base station using the precoded signal.

18. The mobile device of claim 15, wherein the mobile device is configured to use multiple layers within the MIMO scheme simultaneously.

19. The mobile device of claim 16, wherein the mobile device is configured to determine the preferred beam based upon a comparison of CQIs from the plurality of beams.

20. The mobile device of claim 19, wherein the mobile device is configured to report only the CQI and an ID of the determined beam.

* * * * *